(12) United States Patent
Kitamura et al.

(10) Patent No.: US 8,273,171 B2
(45) Date of Patent: Sep. 25, 2012

(54) PEARLESCENT PIGMENT

(75) Inventors: Takeaki Kitamura, Tokyo (JP); Juichi Ino, Tokyo (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 124 days.

(21) Appl. No.: 12/438,602

(22) PCT Filed: Aug. 29, 2007

(86) PCT No.: PCT/JP2007/066794
§ 371 (c)(1),
(2), (4) Date: May 20, 2009

(87) PCT Pub. No.: WO2008/026651
PCT Pub. Date: Mar. 6, 2008

(65) Prior Publication Data
US 2010/0249304 A1 Sep. 30, 2010

(30) Foreign Application Priority Data

Aug. 29, 2006 (JP) .................................. 2006-232752
Oct. 2, 2006 (JP) .................................. 2006-270760

(51) Int. Cl.
*C09C 1/36* (2006.01)
(52) U.S. Cl. ........ 106/436; 106/417; 106/418; 106/439; 106/442; 106/459; 429/59; 524/403; 524/406; 524/430; 524/431; 524/449; 524/612; 523/161
(58) Field of Classification Search .................. 524/403, 524/406, 430, 431, 449, 612
See application file for complete search history.

(56) References Cited

U.S. PATENT DOCUMENTS

| | | | | |
|---|---|---|---|---|
| 3,370,971 A | | 2/1968 | Linton | |
| 3,483,009 A | * | 12/1969 | Willis | 106/287.18 |
| 3,497,374 A | * | 2/1970 | Nix | 106/505 |
| 3,545,994 A | * | 12/1970 | Lott, Jr. et al. | 106/436 |
| 3,585,160 A | * | 6/1971 | Miller et al. | 524/504 |
| 3,711,433 A | * | 1/1973 | Willey | 524/40 |
| 4,084,983 A | | 4/1978 | Bernhard et al. | |
| 4,239,548 A | | 12/1980 | Barnard et al. | |

(Continued)

FOREIGN PATENT DOCUMENTS

DE 24 29 762 1/1976

(Continued)

OTHER PUBLICATIONS

Sun, et al., "Preparation and Characterization of the Mica Titanium Optical Interferential Pigment Coated by $Nd_2O_3$", Bulletin of the Chinese Ceramic Society, vol. 25, No. 6, Dec. 2006—5 pages.

*Primary Examiner* — Sikyin Ip
*Assistant Examiner* — Ross J Christie
(74) *Attorney, Agent, or Firm* — Hamre, Schumann, Mueller & Larson, P.C.

(57) ABSTRACT

A pearlescent pigment (100) includes: a flaky substrate (10); a titanium dioxide layer (20) that is formed on the flaky substrate (10); and an oxazoline compound layer (40) that is formed on the titanium dioxide layer (20) with the titanium dioxide layer (20) being interposed between the flaky substrate (10) and the oxazoline compound layer (40), and serves as a top surface of the pearlescent pigment (100).

12 Claims, 3 Drawing Sheets

U.S. PATENT DOCUMENTS

| | | | |
|---|---|---|---|
| 4,375,373 A | | 3/1983 | Abe et al. |
| 4,544,415 A | | 10/1985 | Franz et al. |
| 5,183,504 A | | 2/1993 | Kuwajima et al. |
| 5,223,034 A | | 6/1993 | Nitta et al. |
| 5,423,912 A | * | 6/1995 | Sullivan et al. .............. 106/417 |
| 5,436,077 A | | 7/1995 | Matsuba et al. |
| 5,472,491 A | | 12/1995 | Duschek et al. |
| 5,668,077 A | | 9/1997 | Klopries et al. |
| 5,734,068 A | | 3/1998 | Klopries et al. |
| 5,753,371 A | | 5/1998 | Sullivan et al. |
| 5,759,255 A | | 6/1998 | Venturini et al. |
| 5,874,072 A | * | 2/1999 | Alwattari et al. ............ 424/70.7 |
| 5,985,258 A | * | 11/1999 | Alwattari et al. ............ 424/70.7 |
| 6,033,466 A | * | 3/2000 | Ito ................................. 106/486 |
| 6,348,533 B1 | | 2/2002 | Kishimoto et al. |
| 6,488,867 B1 | | 12/2002 | Matsumoto et al. |
| 6,491,932 B1 | | 12/2002 | Ramin et al. |
| 6,620,868 B1 | * | 9/2003 | Wilke ............................ 524/94 |
| 6,630,018 B2 | | 10/2003 | Bauer et al. |
| 6,783,584 B2 | | 8/2004 | Takahashi |
| 212,487 A1 | | 9/2007 | Anselmann et al. |
| 7,413,599 B2 | | 8/2008 | Henglein et al. |
| 2002/0031534 A1 | | 3/2002 | Horino |
| 2002/0064664 A1 | | 5/2002 | Kishimoto et al. |
| 2002/0096087 A1 | | 7/2002 | Glausch |
| 2003/0105201 A1 | * | 6/2003 | Auschra et al. ............... 524/415 |
| 2003/0129149 A1 | | 7/2003 | Pike et al. |
| 2003/0166755 A1 | * | 9/2003 | Muhlebach et al. .......... 524/414 |
| 2004/0134385 A1 | * | 7/2004 | Anselmann et al. .......... 106/415 |
| 2004/0143032 A1 | * | 7/2004 | Auschra et al. ............... 523/160 |
| 2005/0004317 A1 | * | 1/2005 | Auschra et al. ............... 525/244 |
| 2005/0014865 A1 | * | 1/2005 | Bagala et al. ................. 523/171 |
| 2006/0159634 A1 | * | 7/2006 | Heinrichs ........................ 424/59 |
| 2006/0159635 A1 | * | 7/2006 | Meyer et al. ................... 424/59 |
| 2007/0015012 A1 | * | 1/2007 | Bujard et al. ............... 428/845.1 |
| 2007/0032573 A1 | | 2/2007 | Yanagase et al. |
| 2007/0299196 A1 | * | 12/2007 | Ohkoshi et al. ............... 524/517 |
| 2010/0129412 A1 | | 5/2010 | Kitamura |
| 2010/0137488 A1 | | 6/2010 | Kitamura et al. |

FOREIGN PATENT DOCUMENTS

| | | | |
|---|---|---|---|
| DE | 19739124 A1 | * | 6/1998 |
| EP | 0 342 533 A1 | | 11/1989 |
| EP | 0 649 886 | | 4/1995 |
| EP | 0 882 673 | | 12/1998 |
| EP | 1671956 A1 | * | 6/2006 |
| JP | 48-032415 B | | 10/1973 |
| JP | 55-018469 B2 | | 5/1980 |
| JP | 1-138270 | | 5/1989 |
| JP | 01138270 A | * | 5/1989 |
| JP | 1-313575 | | 12/1989 |
| JP | 3-054126 A | | 3/1991 |
| JP | 3-066764 A | | 3/1991 |
| JP | 4-193725 | | 7/1992 |
| JP | 6-319996 | | 11/1994 |
| JP | 10-81837 | | 3/1998 |
| JP | 10-158572 | | 6/1998 |
| JP | 10-508599 | | 8/1998 |
| JP | 10-259317 | | 9/1998 |
| JP | 10-292152 | | 11/1998 |
| JP | 11-012426 | | 1/1999 |
| JP | 11-130975 | | 5/1999 |
| JP | 2000-169122 | | 6/2000 |
| JP | 2001-031421 A | | 2/2001 |
| JP | 2001-072933 | | 3/2001 |
| JP | 2001-89324 | | 4/2001 |
| JP | 2001-234090 | | 8/2001 |
| JP | 2002-20218 | | 1/2002 |
| JP | 2002-200844 | | 7/2002 |
| JP | 2003-012461 | | 1/2003 |
| JP | 2003-213156 | | 7/2003 |
| JP | 2004-512394 | | 4/2004 |
| JP | 2004-262794 | | 9/2004 |
| JP | 2004-275972 | | 10/2004 |
| JP | 2004-533510 | | 11/2004 |
| JP | 2005-187782 A | | 7/2005 |
| JP | 2006-192384 | | 7/2006 |
| JP | 2006-282572 | | 10/2006 |
| JP | 2007-051110 | | 3/2007 |
| JP | 2007138053 A | * | 6/2007 |
| JP | 2007-217319 | | 8/2007 |
| JP | 2007-217495 | | 8/2007 |
| WO | 96/14278 | | 5/1996 |
| WO | 99/62646 | | 12/1999 |
| WO | 02/31058 | | 4/2002 |
| WO | 02/090448 | | 11/2002 |

* cited by examiner

PEARLESCENT PIGMENT

TECHNICAL FIELD

The present invention relates to a pearlescent pigment. The present invention also relates to a resin composition, a paint, a coating material, a printing ink, and an adhesive, each containing the pearlescent pigment.

BACKGROUND ART

As pearlescent pigments, there have been conventionally known flaky aluminum powders, mica flakes and graphite flakes coated with metal oxides such as titanium dioxide and iron oxide, iron oxide particles composed mainly of alpha-iron oxide crystals, and the like. These pearlescent pigments reflect light incident upon their surfaces and shine brilliantly. Therefore, when these pearlescent pigments are blended in a paint, an ink, or a resin composition, the surfaces coated with the paint, the lines drawn with the ink or the surfaces printed therewith, or the surfaces of products molded from the resin composition exhibit unique appearances full of variety and excellent in decorative effect, in synergy with the color tones of substrates.

Accordingly, the pearlescent pigments are used widely for various applications, such as paints and coating materials for automobiles, motorcycles, OA (office automation) machines, cellular phones and home electric appliances, and inks for various printing matters or writing materials, for the purpose of improving the decorative effect in their appearances. Among these applications, the pigments particularly are required to have high weather resistance when they are used for automobiles or motorcycles because they are used outdoors. When they are exposed to ultraviolet light, titanium dioxide and/or iron oxide contained in the pigments accelerate decomposition and discoloration due to their photocatalytic activity.

In order to prevent a pigment-induced decomposition and discoloration, JP 60 (1985)-92359 A, for example, discloses a pigment in which polysiloxane and a rare earth metal compound are deposited on mica flakes coated with a metal oxide.

JP 01 (1989)-292067 A discloses a pigment in which the following hydrates (i) and (ii) are deposited on the surface of mica flakes coated with a metal oxide. The hydrates are: (i) a hydrated zirconium oxide produced by hydrolysis of a zirconium compound in the presence of hypophosphorous acid; and (ii) an hydrated oxide produced by hydrolysis of a water-soluble compound of at least one metal selected from the group consisting of cobalt, manganese, and cerium.

JP 07 (1995)-18199 A discloses a pigment in which a sheet-shaped fine substrate coated with a metal oxide is coated with a covering layer. The covering layer contains silicon dioxide, metal hydroxide, and an organic coupling agent.

JP 07 (1995)-268241 A discloses that mica coated with titanium dioxide or iron oxide further is coated with cerium hydrate and aluminum oxide.

JP 2000-505833 T discloses that mica coated with titanium dioxide or iron oxide further is coated with aluminum hydroxide (or cerium hydroxide and aluminum hydroxide) and further subjected to treatment with a silane coupling agent.

JP 2002-194247 A discloses a pearlescent pigment in which a layer composed of a hydroxide of Al or Si, a layer composed of a hydroxide of at least one selected from the group consisting of Al, Si, Ce and Zr, and a layer composed of an organic hydrophobic coupling agent are formed on a flake-shaped substrate.

Although the above-mentioned improvements have been made, conventional pearlescent pigments have not necessarily achieved a high enough level in their weather resistance and water resistant secondary adhesion (adhesion after water resistance test) to coating films composed of a cured resin composition, particularly to coating films composed of an aqueous emulsion or water-soluble cured resin composition. In addition, the random orientation of pearlescent pigment particles makes it difficult to obtain a high design property. Uniform orientation of pearlescent pigment particles in a paint spread allows the pigment to exhibit strong interference colors, which enhances its design property.

As paints containing flaky pearlescent pigments, for example, those containing, as a main binder, an epoxy resin, an acrylic resin, a polyester resin, or the like, and blended with a curing agent such as polyvalent carboxylic acid, block isocyanate, or the like, as necessary, are widely known. These paints are used in many applications such as home electric appliances, automobiles, and construction materials.

Problems in each of the following fields of applications will be described below in detail.

In the field of inks, in recent years, there has been an active movement to shift from solvent-type inks to water-based inks in terms of environmental protection and resource saving. With this active movement, the requirements for binders have become more and more strict. Generally, the properties required for water-based inks are: (1) good flowability; (2) excellent storage stability; (3) quick drying; (4) good adhesion to a substrate, particularly to a plastic film; (5) high gloss; (6) good water resistance and abrasion resistance; and so forth. Water resistant secondary adhesion to a plastic film is, among others, an important required property.

As an ink having these properties, for example, JP 55 (1980)-18469 B discloses an ink composition using, as a binder, a polymer obtained from a (meth)acrylic acid derivative.

In the field of automobile painting, a so-called "two coat one bake method" is employed. According to this method, first, a metallic base paint containing a metallic pigment is applied as a top coat layer to a coated surface that has been subjected to undercoating and intermediate coating. Next, a clear coat paint further is applied to the top coat layer by a wet-on-wet technique without curing this metallic base paint. Then, the clear coating film and the metallic base coating film are cured simultaneously.

In the two coat one bake method as described above, paints containing organic solvents mainly have been used conventionally. However, from the viewpoints of safety during coating, prevention of environmental contamination, saving of resources, and so forth, there has been a strong demand for a shift to water-based paints. Therefore, a variety of water-based paints for automobiles have been developed. For example, JP 04 (1992)-25582 A discloses a water-based metallic base paint containing, as its main components, an acidic resin having an amide group and an aqueous dispersion of a polyurethane resin having a hydrophilic group.

Some of the water-based metallic base paints used in the "two coat one bake method" contain a resin having a hydroxyl group and a carboxyl group, an amide resin (for example, an alkyl-etherified methylol melamine resin), and a pearlescent pigment. When this type of water-based paints is used, during simultaneous curing of a clear coating film and a metallic base coating film, alcohol is produced as a by-product of a reaction between a hydroxyl group and an alkyl ether group while formaldehyde is produced as a by-product of a reaction between methylol melamines. The alcohol and formaldehyde volatilize to the outside through the stacked coating films. In this case, the orientation of the pearlescent pigment particles becomes random, which reduces the flop property thereof.

DISCLOSURE OF INVENTION

The present invention has been devised in view of the problems described above. It is an object of the present invention to provide a pearlescent pigment exhibiting high weather resistance and water resistant secondary adhesion even under harsh environments and having a high flop property. It is a further object of the present invention to provide a resin composition, a paint, a coating material, a printing ink, and an adhesive, each containing the pearlescent pigment.

The present invention provides a pearlescent pigment including: a flaky substrate; a first layer that contains titanium dioxide and/or iron oxide and is formed on the flaky substrate; a second layer that contains a compound having an oxazoline group, is formed on the first layer with the first layer being interposed between the flaky substrate and the second layer, and serves as a top surface of the pearlescent pigment.

It is preferable that the first layer consists essentially of titanium dioxide and/or iron oxide. The word "essentially" is not intended to exclude an unavoidable inclusion of impurities, but permits an inclusion of 1.0 mass % or less of impurities.

The pearlescent pigment further may include a third layer that is provided between the first layer and the second layer and contains a polyvalent metal compound. In this case, the polyvalent metal compound can be a hydroxide or hydrated oxide of at least one metal selected from the group consisting of lanthanum, cerium, and tungsten.

The present invention provides a resin composition, a paint, a coating material, a printing ink, and an adhesive, each containing the above-mentioned pearlescent pigment.

According to the above-mentioned pearlescent pigment, the layer (first layer) of titanium oxide and/or iron oxide is coated with the second layer that contains a compound having an oxazoline group, and the second layer serves as the top surface of the pigment. When this pigment is added into a carboxyl group-containing matrix such as a carboxyl group-containing resin, an oxazoline group opens its ring to form an amide ester bond with a carboxyl group during, for example, forming of a coating film, as shown in a reaction formula of FIG. 5. In other words, the carboxyl group and the oxazoline group are cross-linked and cured three-dimensionally on the surface of the pearlescent pigment. This curing reaction is a ring-opening reaction of the oxazoline group. Since this reaction does not produce any by-product, the orientation of the pearlescent pigment particles does not become random, which allows the flop property thereof to be kept at a high level. Thus, a high design property can be obtained. Furthermore, the carboxyl group hardly remains in the interface between the carboxyl group-containing matrix and the pearlescent pigment. Accordingly, the water resistant secondary adhesion of the pigment can be improved significantly, and thus the long-lasting pearlescent glitter can be obtained. For more information on the "flop property", see the following Examples in the present description.

The ring-opening reaction of the oxazoline group proceeds efficiently during, for example, drying of the coating film containing the pearlescent pigment of the present invention. In a material such as a water-based paint and coating material, a carboxyl group in a carboxyl group-containing matrix usually is neutralized with volatile amine or ammonia. Since the oxazoline group does not react with a carboxylic acid salt, the water-based paint and coating material are stable when they are in a liquid state. When the neutralizer volatilizes during drying of the coating film, the carboxyl group is regenerated. With this regeneration, the above-mentioned ring-opening reaction proceeds.

Specifically, since the volatile neutralizer works as a blocking agent, the gelation of a material such as a water-based paint and coating material containing the pearlescent pigment of the present invention does not proceed and thus it is stable when it is in a liquid state. During drying of the coating film, amide esterification reaction develops between the oxazoline group and the carboxyl group. As a result, the carboxyl group hardly remains in the vicinity of the interface between the pearlescent pigment and the resin as a matrix. Accordingly, water is prevented from entering the coating film due to the hydrophilicity of the carboxyl group, and thus the water resistant secondary adhesion of the coating film is improved.

It should be noted that the effect of suppressing the photocatalytic activity of titanium dioxide and/or iron oxide further is enhanced by providing the third layer that contains a polyvalent metal compound between the first layer and the second layer in the above-mentioned pearlescent pigment.

BEST MODE FOR CARRYING OUT THE INVENTION

Figure 1:
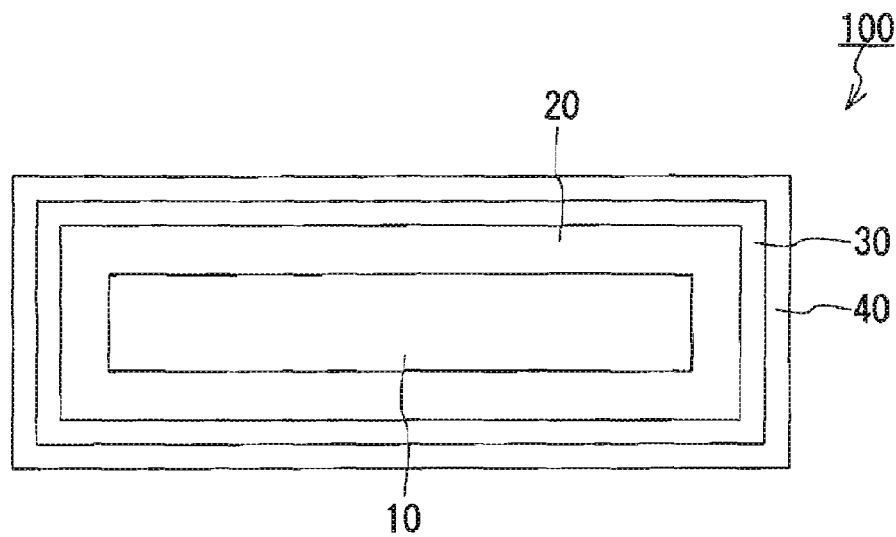
FIG. 1 is a cross-sectional view of an example of a pearlescent pigment according to the present invention.

FIG. 1 shows schematically a cross section of a pearlescent pigment 100 according to an embodiment of the present invention. As shown in FIG. 1, the pearlescent pigment 100 includes a flaky substrate 10, a rutile-type titanium dioxide layer (first layer) 20 that coats the flaky substrate 10, and an oxazoline compound layer (second layer) 40 that serves as the top surface of the pigment 100. These layers are stacked on the flaky substrate 10 in this order. The flaky substrate 10 may be coated with an iron oxide layer instead of the titanium dioxide layer 20, or may be coated with a layer containing titanium dioxide and iron oxide. Furthermore, the first layer that is in contact with the flaky substrate 10 may have a multilayer structure including a titanium dioxide layer and an iron oxide layer. In this case, there is no particular limitation on the order of forming the titanium dioxide layer and the iron oxide layer. The titanium dioxide layer may be in contact with the flaky substrate 10, or the iron oxide layer may be in contact with the flaky substrate 10.

The pearlescent pigment 100 further includes a polyvalent metal compound layer (third layer) 30 that is provided between the rutile-type titanium dioxide layer 20 and the oxazoline compound layer 40. This polyvalent metal compound layer 30 is not an essential element, but it is better to provide the layer 30 from the viewpoint of suppressing the activity of the rutile-type titanium dioxide layer 20 because the layer 30 has an ultraviolet absorbing property. In addition, when the polyvalent metal compound layer 30 is provided, it can be expected that the peeling resistance of the oxazoline compound layer 40 is improved by the chelate effect of the polyvalent metal and the oxazoline group.

The polyvalent metal compound layer 30 includes, as a polyvalent metal compound, a hydroxide or hydrated oxide of at least one metal selected from the group consisting of lanthanum, cerium, and tungsten. The polyvalent metal compound layer 30 may include two or more of the hydroxides or hydrated oxides of these metals.

The polyvalent metal component layer 30 further may contain a hydroxide or hydrated oxide of aluminum. The polyvalent metal component layer 30 may contain the hydroxide or hydrated oxide of aluminum in addition to the hydroxide or hydrated oxide of the metal mentioned above.

The pearlescent pigment 100 further may include another layer (fourth layer) that is provided between the rutile-type titanium dioxide layer 20 and the polyvalent metal compound layer 30 and contains a polyvalent metal compound having a metal element different from the metal element contained in the polyvalent metal compound layer 30.

The oxazoline compound layer 40 is a layer that contains an oxazoline compound as a main component (a component with the highest content in mass %). A coupling agent layer may be provided between the polyvalent metal compound layer 30 and the oxazoline compound layer 40. When the surface of the polyvalent metal compound layer 30 is subjected to treatment with a silane coupling agent so as to introduce a reactive group, the reactive group reacts with the oxazoline group, and thus the bonding strength between the oxazoline compound layer 40 and the polyvalent metal compound layer 30 can be enhanced. In the case where the polyvalent metal compound layer 30 is not provided, a coupling agent layer can be provided between the rutile-type titanium dioxide layer 20 and the oxazoline compound layer 40. Alternatively, the oxazoline compound layer 40 may contain a coupling agent, and the same advantageous effects can be attained likewise in such a case.

In place of the polyvalent metal compound layer 30, another layer (fourth layer) consisting essentially of silicon dioxide (particularly, amorphous silica) may be provided on the rutile-type titanium dioxide layer 20. Furthermore, the above-mentioned another layer may be provided between the rutile-type titanium dioxide layer 20 and the polyvalent metal compound layer 30.

The components mentioned above will be described below.

(Flaky Substrate)

It is preferable that the flaky substrate 10 consists essentially of one selected from the group consisting of glass, mica, synthetic mica, silica, and alumina. There is no particular limitation thereon, but it is preferable to use flaky glass having high surface smoothness as well as high transparency. Flaky glass coated with titanium dioxide and/or iron oxide can exhibit beautiful interference colors.

The flaky glass to be used for the present invention can be produced by the blowing method. The blowing method is a method for obtaining flaky glass in the following manner. Raw cullet is melted and the molten glass is drawn continuously through a circular slit. During the drawing of the molten glass, air is blown through a blow nozzle provided inside the circular slit while stretching and blowing up the molten glass into a balloon shape. The balloon-shaped glass with a smaller thickness then is crushed into flakes, and thus the flaky glass is obtained.

The surface of the flaky glass thus produced retains a fire-polished surface with smoothness as it is at the time of melt-molding. The flaky glass reflects light well because of its smooth surface. A paint or a resin composition blended with this flaky glass has a highly lustrous appearance. Examples of flaky glass like this include MICROGLAS (registered trademark) GLASFLAKE (registered trademark) series (RCF-160, REF-160, RCF-015, REF-015) that are commercially available from Nippon Sheet Glass Co., Ltd.

(Titanium Dioxide Layer)

Preferably, the titanium dioxide layer 20 that coats the flaky substrate 10 consists essentially of rutile-type titanium dioxide. Titanium dioxide has three crystal types: anatase type crystal; brookite type crystal; and rutile type crystal. Among these, anatase type and rutile type titanium dioxides are manufactured industrially. Anatase type titanium dioxide has a strong photocatalytic activity. On the other hand, rutile type titanium dioxide has only about one tenth of the photocatalytic activity of the anatase type titanium dioxide, and therefore is used suitably for a pigment in terms of preventing discoloration and decomposition. Furthermore, the rutile-type titanium dioxide has a higher refractive index than that of the anatase-type titanium dioxide, and allows a dense and uniform coating film to be formed easily. Therefore, the anatase-type titanium dioxide can provide excellent light interference colors.

As a method of producing rutile-type titanium dioxide, for example, JP 2001-31421 A discloses a method in which the rutile-type titanium dioxide is precipitated by neutralization of a titanium-containing solution under the conditions at a temperature of 55° C. to 85° C. and a pH of not more than 1.3. This method does not require intrinsically heating for crystal transition and allows the rutile-type titanium dioxide to be deposited easily on a substrate having low heat resistance. In the pearlescent pigment 100, the thickness of the rutile-type titanium dioxide layer 20 is, for example, in a range of 20 to 400 nm.

Examples of flaky glass that is coated with rutile-type titanium dioxide and exhibits interference colors include METASHINE (registered trademark) RC series, such as MC5090RS, MC5090RY, MC5090RR, MC5090RB, MC5090RG, MC1080RS, MC1080RY, MC1080RB, MC1080RB, MC1080RG, MC1040RS, MC1040RY, MC1040RR, MC1040RB, MC1040RG, MC1030RS, MC1030RY, MC1030RR, MC1030RB, MC1030RG, MC1020RS, MC1020RY, MC1020RR, MC1020RB, MC1020RG, which are commercially available from Nippon Sheet Glass Co., Ltd.

(Iron Oxide Layer)

As with the rutile-type titanium dioxide, iron oxide has a low photocatalytic activity, that is, only about one tenth of the photocatalytic activity of the anatase type titanium dioxide, and therefore is used suitably for a pigment. When iron oxide is used for a pigment, iron oxide absorbs light to allow the pigment to develop chromatic colors and causes light interference to allow the pigment to exhibit interference colors. As an iron oxide for coating the flaky substrate 10, trivalent iron oxide or a mixture of bivalent iron oxide and trivalent iron oxide can be used.

As a method of producing iron oxide, for example, JP 2005-187782 A discloses a method in which iron oxide is precipitated by neutralization of an iron-containing solution under the conditions at a temperature of 50 to 80° C. and a pH of 2 to 4. The thickness of the iron oxide layer is, for example, in a range of 20 to 200 nm.

Examples of flaky glass coated with iron oxide include METASHINE (registered trademark) TC series, such as MC5090TY, MC5090TZ, MC5090TP, MC5090TA, MC5090KY, MC5090KR, MC5090 KB, MC5090KG, MC5090KM, MC1080TY, MC1080TZ, MC1080TP, MC1080TA, MC1080KY, MC1080KR, MC1080 KB, MC1080KG, MC1080KM, MC1040TY, MC1040TZ, MC1040TP, MC1040TA, MC1040KY, MC1040KR, MC1040 KB, MC1040KG, MC1040KM, MC1030TY, MC1030TZ, MC1030TP, MC1030TA, MC1030KY, MC1030KR, MC1030 KB, MC1030KG, MC1030KM, MC1020TY, MC1020TZ, MC1020TP, MC1020TA, MC1020KY, MC1020KR, MC1020 KB, MC1020KG, and MC1020KM, which are commercially available from Nippon Sheet Glass Co., Ltd.

MC5090TY, MC1080TY, MC1040TY, MC1030TY, and MC1020TY are flaky glass in which rutile-type titanium dioxide coating films in METASHINE (registered trademark) RC series MC5090RY, MC1080RY, MC1040RY, MC1030RY, and MC1020RY are coated further with iron oxide.

(Shape and Dimensions of Pearlescent Pigment 100)

The shape of the pearlescent pigment 100 is not particularly limited because it varies depending on the intended use thereof. Generally, it is preferable that the average particle diameter is in a range of 1 μm to 500 μm and the average thickness is in a range of 0.1 μm to 10 μm. In the case where the particle diameter of the pearlescent pigment 100 is excessively large, the flaky glass tends to be crushed easily when the pigment is blended in a paint or a resin composition. Particularly in the case where the flaky glass is coated with titanium dioxide and/or iron oxide, alkaline components contained in the glass may diffuse because the cross sections of the crushed flaky glass are exposed. The average particle diameter refers to a particle diameter corresponding to 50% of cumulative volume percentage in a particle distribution measured with a laser diffraction particle size analyzer.

On the other hand, in the case where the particle diameter is excessively small, the planes of the pearlescent pigment 100 particles in the paint or resin composition are oriented in a random direction, which reduces the reflected light emitted by individual particles. As a result, the lustrous appearance may be lost.

When the pearlescent pigment 100 is used for paints, it is preferable that the particle size is smaller. Preferably, the average particle size thereof is 1 μM to 50 μm and the average thickness thereof is 0.1 μm to 3 μm.

(Polyvalent Metal Compound Layer)

It is preferable that the pearlescent pigment 100 includes the polyvalent metal compound layer 30 in order to improve the weather resistance and water resistant secondary adhesion because the polyvalent metal compound layer 30 absorbs ultraviolet rays to lower the activity of the rutile-type titanium dioxide layer 20 and can form a chelate with an oxazoline group (oxazoline ring). It is preferable that the polyvalent metal compound layer 30 consists essentially of a hydroxide or hydrated oxide of at least one selected from the group consisting of lanthanum, cerium, and tungsten.

(Hydroxide or Hydrated Oxide of Cerium)

A hydroxide or hydrated oxide of cerium can be precipitated on particles (flaky glass substrates coated with titanium dioxide and/or iron oxide) by a reaction between a water-soluble cerium compound and acid or alkali. Examples of the acidic cerium compound to be used include mineral acid salts such as cerium sulfate, cerium chloride, and cerium nitrate. The acidic cerium compound to be used can precipitate a hydroxide or hydrated oxide of cerium by a reaction with alkali such as an alkali metal hydroxide. Preferably, the water-soluble cerium compound is cerium nitrate, and the alkali to react with cerium nitrate is a sodium hydroxide solution. Alkaline cerium salts such as cerium ammonium sulfate and cerium ammonium nitrate may be used instead of an acidic cerium compound. An alkaline cerium salt reacts with acid such as sulfuric acid and hydrochloric acid to precipitate a hydroxide or hydrated oxide of cerium. Preferably, the amount of the cerium compound to be added into an aqueous slurry for forming a polyvalent metal compound layer is in a common range of about 0.1 to 10 mass %, in terms of the total mass of cerium, with respect to the total mass of titanium dioxide and/or iron oxide that coat the flaky substrates (i.e., a percentage of cerium content with respect to the total amount of titanium dioxide and/or iron oxide). More preferably, the amount of the cerium compound to be added into the aqueous slurry for forming the polyvalent metal compound layer is in a range of about 0.5 to 5 mass % with respect to the total mass of titanium dioxide and/or iron oxide. The acid or alkali to be used is added into the slurry in an amount sufficient to react with the cerium compound to precipitate the hydroxide or hydrated oxide of cerium on the particles.

(Hydroxide or Hydrated Oxide of Lanthanum)

A hydroxide or hydrated oxide of lanthanum can be precipitated on particles (flaky glass substrates coated with titanium dioxide and/or iron oxide) by a reaction between a water-soluble lanthanum compound and acid or alkali. Examples of the lanthanum compound to be used include mineral acid salts such as lanthanum sulfate, lanthanum chloride, lanthanum nitrate, lanthanum acetate, and lanthanum carbonate. The lanthanum compound to be used can precipitate a hydroxide or hydrated oxide of lanthanum by a reaction with alkali such as an alkali metal hydroxide. Preferably, the water-soluble lanthanum compound is lanthanum nitrate, and the alkali to react with lanthanum nitrate is a sodium hydroxide solution. Preferably, the amount of the lanthanum compound to be added into an aqueous slurry is in a common range of about 0.1 to 10 mass %, in terms of the total mass of lanthanum, with respect to the total mass of titanium dioxide and/or iron oxide. More preferably, the amount of the lanthanum compound to be added into the aqueous slurry is in a range of about 0.5 to 5 mass % with respect to the total mass of titanium dioxide and/or iron oxide. The acid or alkali to be used is added into the slurry in an amount sufficient to react with the lanthanum compound to precipitate the hydroxide or hydrated oxide of lanthanum on the particles.

(Hydrated Oxide of Tungsten)

A hydrated oxide of tungsten can be precipitated on particles (flaky glass substrates coated with titanium dioxide and/or iron oxide) by a reaction between a water-soluble tungsten compound and acid. Examples of the tungsten compound to be used include mineral acid salts such as sodium tungstate, potassium tungstate, ammonium metatungstate, and ammonium paratungstate. Preferably, the water-soluble tungsten compound is sodium tungstate, and as a phosphate compound to react with sodium tungstate, orthophosphoric acid, pyrophoric acid, polyphosphoric acid, metaphosphoric acid, or the like can be used. Preferably, the amount of the tungsten compound to be added into an aqueous slurry is in a common range of about 0.1 to 10 mass %, in terms of the total mass of tungsten, with respect to the total mass of titanium dioxide and/or iron oxide. More preferably, the amount of the tungsten compound to be added into the aqueous slurry is in a range of about 0.5 to 5 mass % with respect to the total mass of titanium dioxide and/or iron oxide. The acid or alkali to be used is added into the slurry in an amount sufficient to react with the tungsten compound to precipitate the hydroxide or hydrated oxide of tungsten on the particles.

It is preferable that the content of the hydroxides or hydrated oxides of the above-mentioned metals is about 0.1 to 10 mass %, in terms of the total mass of the metals, with respect to the total mass of titanium dioxide and/or iron oxide that coat the flaky substrates. More preferably, the content of the hydroxides or hydrated oxides is about 0.5 to 5 mass % with respect to the total mass of titanium dioxide and/or iron oxide. In the case where the content thereof is less than 0.1 mass %, the effect of improving the weather resistance hardly can be expected. On the other hand, in the case where the content thereof exceeds 10 mass %, the design property may be lost.

Particularly, in the case where the polyvalent metal compound layer 30 contains a hydroxide or hydrated oxide of cerium, it is recommended that the upper limit of the content of metal cerium in the polyvalent metal compound layer 30 is set to about 3 mass % with respect to the total mass of titanium dioxide and/or iron oxide. The residual portion of the polyvalent metal compound layer 30 can be composed of a transparent and colorless hydroxide or hydrated oxide of lanthanum, tungsten, or other metals. Thereby, it is possible to prevent, without fail, coloration which may cause a negative effect in the design property from occurring.

By forming a layer composed of a hydroxide or hydrated oxide of at least one selected from the group consisting of lanthanum, cerium, and tungsten, the weather resistance of the pigment is improved, as shown in the Examples to be described later. It is not clear at present why the weather resistance is improved, but the present inventors consider it to be as follows. Upon exposure to strong ultraviolet rays, the photocatalytic activities of rutile-type titanium dioxide and iron oxide are excited to degrade the surrounding matrix resin, although their photocatalytic activities are only about one tenth of that of anatase-type titanium dioxide. However, since the above-mentioned hydroxide layer has a strong ultraviolet absorbing effect, it absorbs ultraviolet rays before the ultraviolet rays reach the rutile-type titanium dioxide layer and/or the iron oxide layer of the pigment in the matrix resin and thus inhibits the excitation of the photocatalytic activities of rutile-type titanium dioxide and iron oxide. Thus, the weather resistance of the pearlescent pigment is improved.

(Hydroxide or Hydrated Oxide of Aluminum)

A hydroxide or hydrated oxide of aluminum can be obtained by reaction of an acidic or alkaline aluminum compound and appropriate alkali or acid, and can be precipitated on particles (flaky substrates coated with titanium dioxide and/or iron oxide) simultaneously with the above-mentioned reaction. Examples of the acidic aluminum compound to be used include mineral acid aluminum salt such as aluminum chloride, aluminum sulfate, and aluminum nitrate. Examples of the alkaline aluminum compound include alkali metal aluminate such as sodium aluminate. The amount of the acidic or alkaline aluminum compound to be added into a slurry is in a common range of about 0.1 to 10 mass %, in terms of the total mass of aluminum, with respect to the total mass of titanium dioxide and/or iron oxide. Preferably, the amount of the aluminum compound to be added into the aqueous slurry is in a range of about 0.5 to 5 mass %. Appropriate acid or alkali is added into the slurry in an amount sufficient to precipitate the hydroxide or hydrated oxide of aluminum on the substrates simultaneously with or subsequent to the addition of the aluminum compound.

(Amorphous Silica)

One of the examples of the method of preventing diffusion of alkaline components contained in the glass is a method of forming an amorphous silica layer on the titanium dioxide layer 20. There is no particular limitation on the method of forming amorphous silica. Any one of the known methods such as a method of precipitating an oxide from a metal salt, a sol-gel method, a CVD method, and an LPD method, as long as a thin film can be formed on the surface of a powder.

A first example of the known methods is, as disclosed in JP 46 (1971)-9555 B, a method (metal salt method) in which sodium silicate (water glass) is added into a slurry of a powder under an alkaline environment so as to precipitate silica on the surface of the powder. Another example thereof is, as disclosed in JP 48 (1973)-32415 B and JP 03 (1991)-54126 A, a method (sol-gel method) in which a mixture of a powder and a tetraalkoxysilane is added to a basic solution so as to form a silica film on the surface of the powder through hydrolysis of tetraalkoxysilane. Still another example thereof is, as disclosed in JP 03 (1991)-066764 A, a method (LPD method) in which a powder is suspended in a silicofluoric acid solution, and then the equilibrium is shifted by adding boric acid or aluminum or raising the temperature, thus forming a silica film on the powder.

In the case where an amorphous silica layer is formed additionally on the pearlescent pigment 100 of the present embodiment, the content of the amorphous silica in the pearlescent pigment preferably is 0.1 to 30.0 mass %. When the content is less than 0.1 mass %, the effect of preventing the elution of metal ions cannot be expected so much. On the other hand, when the content exceeds 30.0 mass %, the amorphous silica layer becomes cracked and tends to peel off.

(Oxazoline Compound Layer)

The oxazoline compound layer 40 is provided in order to bring a matrix having a carboxyl group or a matrix having a carboxyl group and a hydroxyl group into close adhesion firmly to the pearlescent pigment 100, and serves as the top surface of the pearlescent pigment 100. It is particularly preferable to use a polyvalent oxazoline compound having two or more oxazoline groups in one molecule.

There is no particular limitation on the polyvalent oxazoline compound as long as it has two or more oxazoline rings in one molecule. The polyvalent oxazoline may be a polymer or a low-molecular-weight compound such as an oligomer.

(Oxazoline Ring-Containing Polymer)

As an oxazoline compound, an oxazoline ring-containing polymer that serves as a resin cross-linking-type surface treatment agent can be used. There is no particular limitation on such an oxazoline ring-containing polymer as long as it is a polymer having an oxazoline group represented by the following general formula (1). For example, this oxazoline ring-containing polymer can be obtained by polymerizing, in an aqueous medium, a monomer component including an addition-polymerizable oxazoline as an essential component and, if necessary, further including other unsaturated monomers (such as, acrylic acid, methacrylic acid, and derivatives thereof, for example) by a conventional known polymerization method. In the formula (1), $R^1$, $R^2$, $R^3$ and $R^4$ each are a hydrogen atom, a halogen atom, an alkyl group, an aralkyl group, a phenyl group, or a substituted phenyl group. They all may be any one of these or may be different from each other.

[Chemical formula 1]

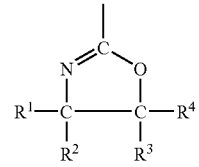

Examples of the above-mentioned addition-polymerizable oxazoline include compounds represented by the following general formula (2). In the formula (2), $R^1$, $R^2$, $R^3$ and $R^4$ are the same as those mentioned above. $R^5$ is a non-cyclic organic group having an addition-polymerizable unsaturated bond.

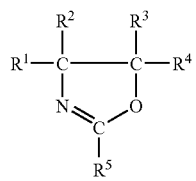

[Chemical formula 2]

Specific examples of the above-mentioned compounds include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, and 2-isopropenyl-5-ethyl-2-oxazoline. These compounds may be used either alone respectively or in combination with each other. Among these compounds, the 2-isopropenyl-2-oxazoline is more suitable because it is industrially easily available.

The amount of the above-mentioned addition-polymerizable oxazoline to be used is not particularly limited, but preferably is, for example, not smaller than 5 mass % with respect to 100 mass % of the total amount of monomer components to be used for producing an oxazoline ring-containing polymer. In the case where the amount of the addition-polymerizable oxazoline is smaller than 5 mass %, a cross-link between the pearlescent pigment of the present invention and a matrix resin is not strong enough, and thus the effect of improving the durability and water resistance can hardly be expected. There is no particular limitation on the other unsaturated monomer as long as it is copolymerizable with an addition-polymerizable oxazoline and does not react with an oxazoline group. For example, one of the above-mentioned unsaturated monomers or two or more of them can be used.

The above-mentioned oxazoline ring-containing polymer preferably is water-soluble, water-reducible or water-dispersible, and more preferably it is water-soluble. In order to obtain the water-soluble oxazoline ring-containing polymer, the ratio of a hydrophilic monomer in the monomer components to be subjected to polymerization preferably is not less than 50 mass %, and more preferably in the range of 60 to 90 mass % from the viewpoint of water solubility and curability. Examples of the hydrophilic monomer include the above-mentioned addition-polymerizable oxazoline, 2-hydroxyethyl (meth)acrylate, methoxypolyethylene glycol (meth)acrylate, monoesterified products of (meth)acrylic acid and polyethylene glycol, 2-aminoethyl (meth)acrylate and its salts, sodium (meth)acrylate, ammonium (meth)acrylate, (meth) acrylonitrile, (meth) acrylamide, N-methylol(meth)acrylamide, N-(2-hydroxyethyl)(meth)acrylamide, and sodium styrenesulfonate. Among these, monomers each having a polyethylene glycol chain such as the methoxypolyethylene glycol (meth)acrylate and monoesterified products of (meth)acrylic acid and polyethylene glycol are preferred because of their high water solubility.

The polymerization method for obtaining the above-mentioned oxazoline ring-containing polymer is not particularly limited, but various conventional polymerization methods can be applied thereto. Examples thereof include solution polymerization, emulsion polymerization, suspension polymerization, and bulk polymerization, each performed in an aqueous medium. Reaction conditions may be set according to the composition of the monomer components and so forth, and they are not particularly limited. Preferably, the reaction temperature is in the range of 20 to 150° C., and the reaction time is in the range of 1 to 24 hours, for example. In addition, the monomer components, for example, may be added to a reactor in a lump or may be added thereto in drops continuously or gradually. It is more preferable to carry out the polymerization under an atmosphere of inert gas such as nitrogen gas.

The oxazoline value of the obtained polymer preferably is in the range of 50 to 3000 g-solid/eq., more preferably 100 to 2000 g-solid/eq., and still more preferably 200 to 1500 g-solid/eq. Among these oxazoline group-containing polymers thus obtained, a polymer having a number average molecular weight of 1000 to 10000 and a glass transition temperature of 40 to 120° C. is suitable for the present invention. It should be noted that the oxazoline value denotes a polymer weight per 1 mol of oxazoline groups (weight per oxazoline equivalent). In other words, the smaller the oxazoline value is, the larger the amount of oxazoline groups in the polymer is, and the larger the oxazoline value is, the smaller the amount of oxazoline groups in the polymer is.

Examples of the above-mentioned oxazoline-containing resin include water-soluble type resins such as EPOCROS WS-500, WS-700, etc., and emulsion type resins such as EPOCROS K-2010, K-2020, K-2030, etc. (manufactured by Nippon Shokubai Co., Ltd.). The water-soluble type resin is particularly preferred because it is highly reactive with a base compound.

(Low-Molecular Weight Polyvalent Oxazoline Compound)

In the case of a low-molecular weight compound, a polyvalent oxazoline compound having two or more oxazoline groups in one molecule, specifically an oligomer is preferred. Preferred examples of the dioxazoline compound having two oxazoline groups in one molecule include those represented by the following general formula (3). In the formula (3), "E" denotes an alkylene group that may have a substituent, a cycloalkylene group that may have a substituent, or an arylene group that may have a substituent. In the formula (3), $R^1$, $R^2$, $R^3$ and $R^4$ each are a hydrogen atom, an alkyl group, or an aryl group. They all may be any one of these or may be different from each other.

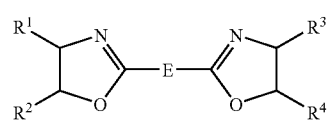

[Chemical formula 3]

Examples of the alkylene group as "E" in the above-mentioned bisoxazoline compound include C1-10 alkylene groups (such as a methylene, ethylene, trimethylene, propylene, tetramethylene, pentamethylene, and hexamethylene groups). The cycloalkylene groups include, for example, C5-10 cycloalkylene groups (such as 1,3-cyclopentylene, 1,3-cyclohexylene, and 1,4-cyclohexylene groups). The arylene groups include C6-12 arylene groups (such as 1,3-phenylene, 1,4-phenylene, 1,5-naphthylene, and 2,5-naphthylene groups).

These alkylene groups, cycloalkylene groups and arylene groups each may have a substituent. Examples of such a substituent include halogen atoms (such as a fluorine atom, a chlorine atom, and a bromine atom), alkyl groups (having about 1 to 6 carbon atoms, such as methyl, ethyl, propyl, isopropyl, butyl, isobutyl, s-butyl, and t-butyl groups), alkoxy groups (having about 1 to 6 carbon atoms, such as methoxy, ethoxy, propoxy, isopropoxy, and butoxy groups). Preferred examples of "E" include an aryl group that may have a substituent, particularly, a phenylene group that may have a substituent (such as a 1,3-phenylene group and a 1,4-phenylene group).

In the above-mentioned formula, examples of the alkyl groups represented by $R^1$, $R^2$, $R^3$ and $R^4$ are C1-10 alkyl groups such as methyl, ethyl, propyl, isopropyl, butyl, isobutyl, s-butyl, t-butyl, pentyl, and hexyl groups. Among those, the preferred alkyl groups are lower alkyl groups having about 1 to 6 carbon atoms, especially lower alkyl groups having about 1 to 4 carbon atoms (for example, a methyl group, an ethyl group, a propyl group, and an isopropyl group). The aryl groups represented by $R^1$, $R^2$, $R^3$ and $R^4$ include phenyl, 1-naphthyl, 2-naphthyl groups, etc., for example.

The above-described alkyl groups and aryl groups each may have a substituent. Examples of the alkyl group having a substituent include, for example, C1-4 alkyl halide groups such as dichloromethyl, trichloromethyl, trifluoromethyl, 2,2,2-trichloroethyl, 2,2,2-trifluoroethyl, and pentafluoroethyl groups. Examples of the aryl group having a substituent include: phenyl groups each having a halogen atom, such as 2-chlorophenyl, 3-chlorophenyl, 4-chlorophenyl, 2,4-dichlorophenyl, and 3,5-dichlorophenyl groups; C1-4 alkyl-phenyl groups such as 2-methylphenyl, 3-methylphenyl, 4-methylphenyl, 2,4-dimethylphenyl, 3,5-dimethylphenyl, and 4-ethylphenyl groups; and C1-4 alkoxy-phenyl groups such as 2-methoxyphenyl, 3-methoxyphenyl, 4-methoxyphenyl, 2,4-dimethoxyphenyl, 3,5-dimethoxyphenyl, and 4-ethoxyphenyl groups.

Specific examples of the dioxazoline compound represented by the above-mentioned general formula (3) include: 1,6-bis(1,3-oxazoline-2-yl)hexane, 1,8-bis(1,3-oxazoline-2-yl)octane, 1,10-bis(1,3-oxazoline-2-yl)decane, 1,3-bis(1,3-oxazoline-2-yl)cyclohexane, 1,4-bis(1,3-oxazoline-2-yl)cyclohexane, 2,2'-(1,3-phenylene)-bis(2-oxazoline), 2,2'-(1,4-phenylene)-bis(2-oxazoline), 2,2'-(1,2-phenylene)-bis(2-oxazoline), 2,2'-(1,3-phenylene)-bis(4-methyl-2-oxazoline), 2,2'-(1,4-phenylene)-bis(4-methyl-2-oxazoline), 2,2'-(1,2-phenylene)-bis(5-methyl-2-oxazoline), 2,2'-(1,3-phenylene)-bis(5-methyl-2-oxazoline), 2,2'-(1,4-phenylene)-bis(5-methyl-2-oxazoline), 2,2'-(1,3-phenylene)-bis(4-methylphenyl-2-oxazoline), 2,2'-(1,4-phenylene)-bis(4-methylphenyl-2-oxazoline), 2,2'-(1,3-phenylene)-bis(4-chlorophenyl-2-oxazoline), and 2,2'-(1,4-phenylene)-bis(4-chlorophenyl-2-oxazoline). These dioxazoline compounds may be used either alone respectively or in combination with each other.

Examples of the other polyvalent oxazoline compounds include trioxazoline compounds having three oxazoline groups in one molecule, such as 2,2'-(1,2,4-phenylene)-tris-(2-oxazoline). Two or more of these trioxazoline compounds may be used in combination.

(Combined Use of Coupling Agent)

In order to improve the water resistance, a coupling agent may be used as a coating in combination with a polyvalent oxazoline compound. In other words, the oxazoline compound layer 40 may contain a coupling agent. When the oxazoline compound layer 40 contains a coupling agent, the residue of the coupling agent forms a bond between the oxazoline groups and the titanium dioxide layer 20 or the polyvalent metal compound layer 30. Even without using such a coupling agent, a polyvalent oxazoline compound bonds to a primary coating layer due to chelation. Therefore, the coupling agent is not an essential component.

Typical examples of the coupling agent include organic coupling agents, particularly organic silane coupling agents. The silane coupling agent may be selected depending on the resin to be used, but at least one selected from the group consisting of vinylsilane, epoxysilane, methacryloxysilane, aminosilane, isocyanate silane, and mercaptosilane can be used. Furthermore, alkoxysilane or the like, which is not treated as a silane coupling agent, further may be contained in addition to the silane coupling agent.

Examples of the epoxysilane include 2-(3,4-epoxycyclohexyl)ethyltrimethoxysilane, 3-glycidoxy propyltrimethoxysilane, 3-glycidoxy propylmethyldiethoxysilane, and 3-glycidoxy propyltriethoxysilane.

Examples of the methacryloxysilane include 3-methacryloxy propylmethyldimethoxysilane, 3-methacryloxy propyltrimethoxysilane, 3-methacryloxy propylmethyldiethoxysilane, and 3-methacryloxy propyltriethoxysilane.

Examples of the aminosilane include N-2(aminoethyl-aminopropylmethyldimethoxysilane, N-2(aminoethyl)3-aminopropyltrimethoxysilane, 3-aminopropyltrimethoxysilane, 3-aminopropyltriethoxysilane, 3-triethoxysilyl-N-(1,3-dimethyl-butylidene)propylamine, and N-phenyl-3-aminopropyltrimethoxysilane.

Examples of the isocyanate silane include 2-isocyanate ethyltrimethoxysilane, 2-isocyanate ethyltriethoxysilane, 3-isocyanate propyltrimethoxysilane, and 3-isocyanate propyltriethoxysilane.

Examples of the mercaptosilane include 3-mercapto propyltrimethoxysilane.

Examples of the alkoxysilane which is not treated as a silane coupling agent include trimethylmethoxysilane, trimethylethoxysilane, dimethyldimethoxysilane, dimethyldiethoxysilane, methyltrimethoxysilane, methyltriethoxysilane, methyldimethoxysilane, methyldiethoxysilane, dimethylethoxysilane, dimethylvinylmethoxysilane, dimethylvinylethoxysilane, methylvinyldimethoxysilane, methylvinyldiethoxysilane, diphenyldimethoxysilane, diphenyldiethoxysilane, phenyltrimethoxysilane, phenyltriethoxysilane, tetramethoxysilane, and tetraethoxysilane.

It is preferable that the content of the silane coupling agent in the pearlescent pigment is 0.01 to 1.0 mass %. When the content is less than 0.01 mass %, the effect of improving the affinity for the paint or the resin can hardly be expected. On the other hand, when the content exceeds 1.0 mass %, a reaction takes place between the coupling agents, which may impair the affinity for the paint or the resin. In addition, the cost increases.

The coupling agent may be dispersed throughout the oxazoline compound layer 40, or may only be provided between the oxazoline compound layer 40 and the polyvalent metal compound layer 30 (or the titanium dioxide layer 20 in the case where the polyvalent metal compound layer 30 is not provided). In other words, the coupling agent layer and the oxazoline compound layer 40 may be formed in this order. However, even in this case, it can be considered that the coupling agent is contained in the oxazoline compound layer 40.

For example, after the polyvalent metal compound layer 30 (or the titanium dioxide layer 20) is formed, a coupling agent (preferably an organic silane coupling agent) layer is formed thereon. Next, the functional group (organic functional group) of the coupling agent is reacted with dicarboxylic acid so as to obtain a precursor having a carboxyl group on its top surface. The dicarboxylic acid to be used here is preferably dicarboxylic acid anhydride. Examples thereof include maleic acid anhydride, fumaric acid anhydride, and adipic acid anhydride.

The above-mentioned precursor is coated with an oligomer (or a polymer) having an oxazoline group. The carboxyl group of the precursor reacts with the oxazoline group, and thus a pearlescent pigment having a structure represented by the following general formula (4) is obtained. In the formula (4), "A" denotes flaky glass coated with titanium dioxide, "B" denotes a silane coupling agent, and the residual portion denotes the oxazoline compound layer 40. "E" is the same as described above. By doing so, the oxazoline compound layer 40 can be brought into close adhesion firmly to the primary coating layer (the polyvalent metal compound layer 30 or the titanium dioxide layer 20). The oxazoline groups that remain without reacting with the functional groups of the silane coupling agent (right side of the amide-ester bond in the formula) bond with the carboxyl group-containing resin.

[Chemical formula 4]

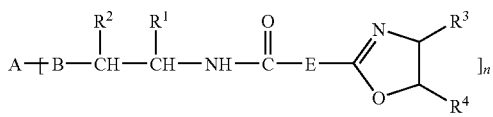

It is more preferable that the polyvalent metal compound layer 30 containing a hydroxide of a polyvalent metal as its main component is formed because the above-mentioned hydroxide is bonded, through dehydration and condensation, with silanol obtained by hydrolysis of the residue of the organic functional groups of the organic silane coupling agent.

(Resin Composition Containing Pearlescent Pigment)

One example of the resin composition of the present invention includes the pearlescent pigment 100 of the present invention and a carboxyl group-containing resin matrix. The resin composition may be in the form of a solution (such as an organic solvent solution and an aqueous solution) or a dispersion liquid (such as an aqueous emulsion). Specific examples of the resin composition include a paint, a coating material, an ink and an adhesive. The resin composition of the present invention can be used for the purposes of improving the durability of the substrate by employing the protective effect of the organic resin, protecting the appearance, adding design properties, and so forth.

Examples of the carboxyl group-containing resin include carboxyl group-containing acrylic acid polymers such as acrylic acid resins (homopolymers), (meth)acrylic acid copolymers, ethylene-(meth)acrylic acid copolymers, vinyl acetate-(meth)acrylic acid copolymers, (meth)acrylate ester (meth)acrylic acid copolymers, and styrene-(meth)acrylic acid copolymers. Other examples thereof include synthetic resins such as styrene-butadiene copolymers (styrene-butadiene latex introduced with a carboxyl group, for example), styrene-maleic anhydride copolymers, carboxyl group-containing urethane resins, carboxyl group-containing polyester resins, carboxyl group-containing alkyd resins, and carboxyl group-containing polyvinyl alcohol resins. Still other examples thereof include natural resins such as carboxymethyl cellulose. Furthermore, two-component resins, such as acrylic-modified polyesters, acrylic-modified polyurethanes, and acrylic-modified epoxy resins, also can be used. Hereinafter, carboxyl group-containing acrylic acid polymers and acrylic-modified epoxy resins will be described in detail.

(Carboxyl Group-Containing Acrylic Acid Polymer)

Carboxyl group-containing acrylic acid polymers can be obtained by copolymerization of, for example, acrylic acid esters and aromatic vinyls or vinyl esters. The carboxyl group-containing acrylic acid polymer preferably contains 0.2 to 30 mass % of structural units derived from monomers (carboxyl group or its salts), for example, and more preferably 1 to 20 mass %. The acid value of the carboxyl group-containing acrylic acid polymer is preferably 2 to 200 mg·KOH/g, and more preferably 10 to 100 mg·KOH/g.

The weight average molecular weight of the carboxyl group-containing acrylic acid polymer is preferably 1000 to 1000000, more preferably 3000 to 500000, and still more preferably 5000 to 100000. The glass transition temperature of the carboxyl group-containing acrylic acid polymer varies in accordance with the intended use of the resin composition, but the temperature of −60 to 50° C. generally is preferred.

In the case where the resin composition is used for a paint, a coating material, or a printing ink, the resin composition preferably contains a carboxyl group-containing acrylic acid polymer having a glass transition temperature of −10 to 50° C. In the case where the resin composition is used for an adhesive, it preferably contains a carboxyl group-containing acrylic acid polymer having a glass transition temperature of −20 to 30° C.

(Acrylic-Modified Epoxy Resin)

In an acrylic-modified epoxy resin, an acrylic vinyl copolymer is introduced to an epoxy resin as a main chain. The carboxyl groups are bonded with the vinyl copolymer.

An acrylic-modified epoxy resin containing carboxyl groups can be obtained by esterification reaction between a vinyl copolymer and an epoxy resin in a hydrophilic organic solvent in the presence of a basic compound. There is no particular limitation on ethylenically unsaturated carboxylic acid monomers that are the source materials of the vinyl copolymer. Examples thereof include acrylic acid, methacrylic acid, maleic acid, fumaric acid, and itaconic acid. Two or more of these may be used. There is no particular limitation on the method of polymerizing these monomer components. For example, they may be polymerized using commonly-used radical polymerization initiator such as azobisisobutyronitrile, and benzoyl peroxide.

The epoxy resin is preferably at least one selected from a bisphenol F type epoxy resin, a bisphenol A type epoxy resin, and a hydrogenated bisphenol A type epoxy resin. In addition, the epoxy resin preferably has an average of 1.1 to 2.0 epoxy groups in one molecule, as well as a number average molecular weight of 900 or more.

The weight average molecular weight of the acrylic-modified epoxy resin is preferably 2000 to 100000, for example. The acrylic-modified epoxy resin having a weight average molecular weight of 2000 to 100000 has excellent emulsification dispersion performance, and thus the gelation thereof hardly occurs during the reaction between the acrylic vinyl copolymer and the epoxy resin.

The resin composition may be in the form of a solution (such as an organic solvent solution and an aqueous solution) or a dispersion liquid (such as an aqueous emulsion) in accordance with the intended use thereof. Examples of an organic solvent suitably used in the organic solvent solution of the carboxyl group-containing resin include: alcohols (such as methanol, ethanol, propanol, isopropanol, and n-butanol); aliphatic hydrocarbons (such as hexane, heptane, octane); alicyclic hydrocarbons (such as cyclohexane); aromatic hydrocarbons (such as benzene, toluene, xylene); esters (such as ethyl acetate, n-butyl acetate, isobutyl acetate, and n-butyl acetate); ketones (such as acetone, methyl ethyl ketone, and methyl isobutyl ketone); ethers (such as diethyl ether, dioxane, and tetrahydrofuran); cellosolves (such as methyl cellosolve (ethylene glycol monomethyl ether), ethyl cellosolve, propyl cellosolve, butyl cellosolve, phenyl cellosolve, and benzyl cellosolve); and carbitols (such as diethylene glycol monomethyl ether, carbitol (diethylene glycol monoethyl ether), and diethylene glycol monopropyl ether). A mixed solvent thereof also can be used.

An aqueous solution of the resin composition can be obtained by dissolving, for example, a carboxyl group-containing acrylic resin in water using alkali. Examples of the alkali include: organic bases such as aliphatic amines (e.g., trimethylamine, triethylamine, ethylenediamine); alkanolamines such as ethanolamine, diethanolamine, dimethylethanolamine, triethanolamine; heterocyclic amines such as morpholine; ammonia; and inorganic bases such as alkali metal compounds (e.g., sodium hydroxide, and potassium hydroxide). Among these, ammonia, diethanolamine, dimethylethanolamine, and triethanolamine are preferred.

It is desirable that the acidic group (e.g., a carboxyl group) contained in the resin matrix be neutralized by a base to the extent that the resin matrix (e.g., carboxyl group-containing acrylic acid polymer) can be water-dispersed. The percentage of the acidic groups to be neutralized is desirably about 50% of all the acidic groups. For example, when the total number of moles of the acidic groups contained in the resin matrix is 1, amine with 0.4 to 2.0 times the number of moles, preferably amine with 0.6 to 1.4 times the number of moles, desirably is used for the neutralization of the acidic groups.

The aqueous emulsion can be prepared by a commonly-used method. One example is a method in which a portion of the carboxyl groups in the carboxyl group-containing acrylic acid polymer is neutralized by a base so as to disperse the carboxyl group-containing acrylic acid polymer. The aqueous emulsion may be prepared by an emulsion polymerization method. For the emulsion polymerization, commonly-used emulsifying agents (for example, anionic surfactants, nonionic surfactants, and protective colloids such as polyvinyl alcohols and water-soluble polymers). The pH of the aqueous emulsion may be adjusted using a pH adjuster.

There is no particular limitation on the density (solid content density) of the matrix resin in the resin composition, but for example, it is preferably 10 to 70 mass %, and more preferably 25 to 50 mass %.

(Cross-Linking/Curing Agent)

The resin composition, paint, coating material, and printing ink each containing the pearlescent pigment of the present invention further may contain a cross-linking/curing agent. As a cross-linking/curing agent, amino resin and/or polyisocyanate can be used. In the case where the resin that forms a matrix of the paint or the coating material has a hydroxyl group, this hydroxyl group reacts with a cross-linking agent such as an amino resin and a polyisocyanate compound to be cured. The amino resin and/or the polyisocyanate compound also reacts and cross-links with carboxyl groups, amino groups, and the like each having an active hydrogen, instead of a hydroxyl group.

Examples of the amino resin (cross-linking/curing agent) include melamine resins such as alkyletherified melamine resins, benzoguanamine resins such as alkyletherified benzoguanamine resins, and urea resins such as alkyletherified urea resins. Among these, melamine resins are preferred. Specific examples of the melamine resins include dimethylol melamine, trimethylol melamine, tetramethylol melamine, pentamethylol melamine, and hexamethylol melamine. Furthermore, the amino resins may be alkyl-etherified products of these melamine resins (e.g., methyl ether, ethyl ether, propyl ether, isopropyl ether, butyl ether, isobutyl ether, etc.), urea-formamide condensation products, or urea-melamine condensation products. Two or more of these amino resins may be used in combination with each other.

It is preferable that the content of the amino resin is set so that the mass ratio between the resin (solid content) that forms the matrix and the amino resin (solid content) is 95/5 to 60/40. It is more preferable that the content thereof is set so that the mass ratio is 85/15 to 65/35. By setting the content of the amino resin in this range of values, the coating film formed by applying the paint and the coating layer obtained by applying the coating material can have high strength as well as high corrosion resistance.

As a polyisocyanate compound (cross-linking/curing agent), for example, a blocked polyisocyanate compound in which the isocyanate groups in polyisocyanate are masked with a blocking agent is suitable. Examples of the polyisocyanate include HDIs (such as hexamethylene diisocyanate), TDIs (such as tolylene diisocyanate), XDIs (such as xylylene diisocyanate), and MDIs (such as diphenylmethylene diisocyanate). Examples of the blocking agent include oxime and lactam.

In the case where the above-mentioned polyisocyanate compound is a blocked polyisocyanate compound, it is preferable that the content thereof is set so that the molar ratio (number of moles of hydroxyl groups/number of moles of regenerated isocyanate groups) between the hydroxyl groups contained in the matrix resin and the deblocked and regenerated isocyanate groups in the polyisocyanate compound is 100/20 to 100/150.

(Method of Application)

The resin composition of the present invention can be used for a paint, a coating material, a printing ink, or an adhesive. Each of them is applied to a body to be coated, and then heated and dried if necessary, and thus a coating film, a coating layer or an adhesive layer is obtained. There is no particular limitation on the method of applying or coating. Examples of the method include commonly used methods such as spray coating, roll coating, knife coating, bar coater coating, dip coating, and brush coating. The thickness of the coating film or the coating layer varies depending on the type of the body to be coated. The thickness thereof is preferably 0.1 to 1000 μm, for example. More preferably, it is 0.2 to 500 μm, and still more preferably 0.3 to 300 μm. The thickness of the adhesive layer varies depending on the type of the body to be coated. The thickness thereof is preferably 1 to 10000 μm, for example. More preferably, it is 5 to 5000 μm, and still more preferably 10 to 3000 μm.

The temperature of the atmosphere in which the paint, the coating material or the adhesive is dried or cured is preferably 10 to 200° C., for example. More preferably, it is 20 to 150° C., and still more preferably 50 to 120° C.

The resin composition of the present invention can be prepared by mixing the pearlescent pigment and the acrylic resin. The resin composition may be a powder, but commonly it is a solution or a dispersion liquid (emulsion) containing an organic solvent or a water solvent in many cases. A preferred resin composition usually contains an organic solvent, and such a resin composition is useful as a coating material or an adhesive.

The resin composition can be prepared by a commonly-used method. For example, it can be prepared using a mixed dispersion machine. The pearlescent pigment and additives (such as a filler) may be dispersed, with a dispersant if necessary, by using a dispersion machine (such as a ball mill, and an ultrasonic disperser).

It is not necessarily appropriate to determine the ratio of the pearlescent pigment to be used because it depends on the molecular weight of the compound having an oxazoline group, the amount of oxazoline to be introduced, the molecular weight and acid value of the acrylic resin, and so forth. For example, the ratio thereof can be selected from a range of approximately 0.1 to 120 parts by mass, in terms of solid content, with respect to 100 parts by mass of the acrylic resin, preferably from a range of approximately 0.5 to 100 parts by mass (1 to 50 parts by mass, for example).

Various additives may be added to the resin composition depending on the intended use. Examples thereof include other thermoplastic resins (such as acrylic resin and polyester resin containing no carboxyl group), thermosetting resins (such as urethane resin and amino resin), antioxidants, ultraviolet absorbers, stabilizers such as heat stabilizers, plasticizers, antistatic agents, dispersants, antiskinning agents, viscosity modifiers such as thickeners, planarizers, anti-dripping agents, mildew proofing agents, preservatives, fillers, and coloring pigments.

A coating film formed of the resin composition that contains the pearlescent pigment 100 and a carboxyl group-containing resin (such as an acrylic resin) has high hardness as well as excellent abrasion resistance and solvent resistance. The coating film thus formed also improves its chemical resistance and adhesion to the substrate or the body to be coated. Accordingly, the above-mentioned resin composition is useful for a paint, a coating material and an adhesive.

It is preferable that the content of the pearlescent pigment 100 in the paint is adjusted so that it falls within the range of 0.1 to 30 mass % in the coating film obtained after drying and curing. More preferably, the content thereof is 1 to 20 mass %. When the content of the pearlescent pigment 100 is less than 0.1 mass %, the effect of improving the brightness of the coating film hardly can be expected. On the other hand, when the content thereof is more than 30 mass %, the brightness is not improved so much in spite of such a high content. Instead, the color tone of the substrate may be impaired.

There is almost no impairment of color tone of the substrate when the pearlescent pigment 100 is used, so the pearlescent pigment 100 can be used in paints of various colors. For example, the pearlescent pigment 100 can be used not only for primary colors such as red, blue, green and black but also other colors, such as pastel colors, for which it is hard to adjust the color tones. In the case where the pearlescent pigment 100 is blended in an ink, it preferably includes the flaky glass substrates 10 having an average thickness of 0.1 to 2 μm and an average particle diameter of 120 μm or less. When the average thickness is 2 μm or more, the handwriting has an appearance such that the pearlescent pigment particles stand out, and thus the smoothness of the handwriting may be lost. The smoothness of the handwriting may be lost also when the average particle diameter exceeds 120 μm. Furthermore, in the case where the pearlescent pigment 100 is blended in gravure inks or offset inks, the average particle diameter is preferably 50 μm or less because they are required to have an aptitude for printing.

EXAMPLES

Hereinafter, the present invention will be described further in detail by way of Examples and Comparative Examples. The present invention, however, is not limited to the following Examples as long as the intent of the present invention is maintained.

The average particle diameter of the pearlescent pigment was measured with a laser diffraction particle size analyzer. The average thickness of the pearlescent pigment particles was obtained by measuring the thicknesses of the end faces of 50 particles with an electron microscope and averaging them. The content of a hydroxide or hydrated oxide of lanthanum, cerium and tungsten was measured with an inductively coupled plasma (ICP) technique after totally dissolving each sample thereof. The content of titanium dioxide and iron oxide was determined by measuring the difference in weight before and after the coating. The contents of silica and aluminum were measured with a secondary ion-microprobe mass spectrometer (SIMS) (IMS-6F, manufactured by Cameca). Specifically, the contents thereof were determined based on the distribution of the components from the surface of the pearlescent pigment to the surface of the flaky glass substrate. The contents of the compound having an oxazoline group (a polymer or an oligomer) and the coupling agent were determined based on the difference in ignition loss before and after heating at 400° C. for 1 hour using a heating/baking furnace. In the following Examples and Comparative Examples, a content is referred to as a deposition amount.

Example 1

Example 1 is a pearlescent pigment in which a coating film of a hydroxide or hydrated oxide of cerium is formed on a flaky glass coated with rutile-type titanium dioxide and a coating film of an oxazoline group-containing polymer further is formed thereon.

As a pearlescent pigment coated with rutile-type titanium dioxide and exhibiting interference colors, METASHINE (registered trademark) MC1020RB manufactured by Nippon Sheet Glass Co., Ltd. was used. This pearlescent pigment has an average particle diameter of 20 μm, an average thickness of 1.6 μm, and a deposition amount of rutile-type titanium dioxide is approximately 26 mass %, and exhibits an interference color of blue luster.

First, a 2 mass % aqueous solution of cerium nitrate was prepared using 0.6 g of cerium (III) nitrate hexahydrate (Ce($NO_3$)$_3$.6$H_2O$). About 50 g of the pearlescent pigment was suspended in 0.5 liter (L) of purified water and kept at 75° C. in a water bath, and the pH of the suspension was adjusted to pH6 with diluted nitric acid. Subsequently, the cerium nitrate solution thus prepared and 2.0 g of a 1N aqueous solution of sodium hydroxide were added slowly to the suspension over a period of 10 minutes. After the addition, the resulting suspension was stirred at 75° C. for 30 minutes while keeping it at pH6. Subsequently, the suspension was filtered with filter paper to obtain a filtered solid. The filtered solid was washed with water. Thus, a pearlescent pigment coated with a hydroxide or hydrated oxide of cerium was obtained.

Furthermore, 2.0 g of an oxazoline group-containing polymer (EPOCROS WS-700 manufactured by Nippon Shokubai, Co., Ltd., resin solid content: 25 mass %, oxazoline value: 220 g/eq) was prepared, added to 0.5 L of ion-exchanged water, and stirred. Thus, a treatment liquid was obtained. Thereafter, about 50 g of the pearlescent pigment coated with the hydroxide or hydrated oxide of cerium was added to the treatment liquid and stirred for 30 minutes. Then, the suspension was filtered with filter paper to obtain a filtered solid. The filtered solid was dried at 120° C. for 2 hours. In this case, the amount of the oxazoline group-containing polymer added was 1 mass % in terms of resin solid content. Thus, a pearlescent pigment, in which the flaky glass is coated with rutile-type titanium dioxide, a hydroxide or hydrated oxide of cerium and an oxazoline group-containing polymer in this order, was obtained.

As a result of an analysis, in the pearlescent pigment thus obtained, the deposition amount of the hydroxide or hydrated oxide of cerium was about 0.3 mass % in terms of cerium, and the deposition amount of the oxazoline group-containing polymer was 0.5 mass %. In this case, the deposition amount of cerium was equivalent to approximately 1.2 mass % of rutile-type titanium dioxide.

Example 2

Example 2 is a pearlescent pigment in which a flaky glass, rutile-type titanium dioxide, a hydroxide or hydrated oxide of cerium, and a layer containing an oxazoline group-containing polymer and a silane coupling agent are formed in this order.

As an organic silane coupling agent, 0.5 g of 3-methacryloxy propyltriethoxysilane (A-174 manufactured by Nippon Unicar Co., Ltd.) was prepared, added to 0.5 L of ion-exchanged water, and stirred for hydrolysis thereof. 2 g of an oxazoline group-containing polymer (EPOCROS WS-700 manufactured by Nippon Shokubai, Co., Ltd., resin solid content: 25 mass %, oxazoline value: 220 g/eq) was prepared, and added to the hydrolysis solution of the silane coupling agent.

Thereafter, about 50 g of the pearlescent pigment coated with the hydroxide or hydrated oxide of cerium was added to the hydrolysis solution and stirred for 30 minutes. Then, the suspension was filtered with filter paper to obtain a filtered solid. The filtered solid was dried at 120° C. for 2 hours. In this case, the amount of the oxazoline group-containing polymer added was 1 mass % in terms of resin solid content. The amount of the organic silane coupling agent added was 1 mass %. Thus, a pearlescent pigment, in which the flaky glass is coated with rutile-type titanium dioxide, a hydroxide or hydrated oxide of cerium, and an oxazoline group-containing polymer and an organic silane coupling agent in this order, was obtained.

As a result of an analysis, in the pearlescent pigment thus obtained, the deposition amount of the hydroxide or hydrated oxide of cerium was about 0.3 mass % in terms of cerium, and the total deposition amount of the oxazoline group-containing polymer and the organic silane coupling agent was 0.6 mass %. In this case, the deposition amount of cerium was equivalent to approximately 1.2 mass % of rutile-type titanium dioxide.

Example 3

Example 3 is a pearlescent pigment in which a flaky glass, rutile-Type titanium dioxide, a layer containing hydroxides or hydrated oxides of cerium and aluminum, and an oxazoline group-containing polymer are formed in this order.

As an aluminum compound, a 2 mass % aqueous solution of aluminum chloride was prepared using 0.6 g of aluminum chloride hexahydrate. Further, a 2 mass % aqueous solution of cerium nitrate was prepared using 0.6 g of cerium (III) nitrate hexahydrate. These aqueous solutions were mixed to the suspension in the same manner as in Example 1 together with 8.0 g of a 1N aqueous solution of sodium hydroxide. The obtained filtered solid was washed and dried. Thus, a pearlescent pigment in which a layer containing hydroxides or hydrated oxides of cerium and aluminum is formed was obtained.

Meanwhile, 2.0 g of an oxazoline group-containing polymer (EPOCROS WS-700 manufactured by Nippon Shokubai, Co., Ltd., resin solid content: 25 mass %, oxazoline value: 220 g/eq) was prepared, added to 0.5 L of ion-exchanged water, and stirred in the same manner as in Example 1. Thus, a treatment liquid was obtained.

Thereafter, 50 g of the pearlescent pigment coated with the above-mentioned hydroxides or hydrated oxides of cerium and aluminum was added to the above-mentioned treatment liquid to prepare a suspension, and stirred for 30 minutes. Then, the suspension was filtered with filter paper to obtain a filtered solid. The filtered solid was dried at 120° C. for 2 hours. In this case, the amount of the oxazoline group-containing polymer added was 1 mass % in terms of resin solid content. Thus, a pearlescent pigment, in which the flaky glass is coated with rutile-type titanium dioxide, hydroxides or hydrated oxides of cerium and aluminum, and an oxazoline group-containing polymer in this order, was obtained.

As a result of an analysis, in the pearlescent pigment thus obtained, the deposition amount of the hydroxide or hydrated oxide of cerium was about 0.3 mass % in terms of cerium, the deposition amount of the hydroxide or hydrated oxide of aluminum was about 0.3 mass % in terms of aluminum, and the deposition amount of the oxazoline group-containing polymer was 0.5 mass %. In this case, the deposition amount of cerium was equivalent to approximately 1.2 mass % of rutile-type titanium dioxide. Furthermore, the deposition amount of aluminum was equivalent to approximately 1.2 mass % of rutile-type titanium dioxide. Accordingly, the total deposition amount of cerium and aluminum was equivalent to approximately 2.4 mass % of rutile-type titanium dioxide.

Example 4

Example 4 is a pearlescent pigment obtained in the same manner as in Example 3, except that a coating film serving as the top surface contains an oxazoline group-containing polymer and an organic silane coupling agent. Specifically, Example 4 is a pearlescent pigment in which a flaky glass, rutile-type titanium dioxide, a layer containing hydroxides or hydrated oxides of cerium and aluminum, and a layer containing an oxazoline group-containing polymer and a silane coupling agent are formed in this order.

As a result of an analysis, in the pearlescent pigment thus obtained, the deposition amount of the hydroxide or hydrated oxide of cerium was about 0.3 mass % in terms of cerium, the deposition amount of the hydroxide or hydrated oxide of aluminum was about 0.3 mass % in terms of aluminum, and the total deposition amount of the oxazoline group-containing polymer and the organic silane coupling agent was 0.6 mass %. In this case, the deposition amount of cerium was equivalent to approximately 1.2 mass % of rutile-type titanium dioxide. Furthermore, the deposition amount of aluminum was equivalent to approximately 1.2 mass % of rutile-type titanium dioxide. Accordingly, the total deposition amount of cerium and aluminum was equivalent to approximately 2.4 mass % of rutile-type titanium dioxide.

Example 5

Example 5 is a pearlescent pigment in which a silica coating film is formed on a flaky glass coated with rutile-type titanium dioxide. Specifically, Example 5 is a pearlescent pigment in which a flaky glass, rutile-type titanium dioxide, silica, a hydroxide or hydrated oxide of cerium, and an oxazoline group-containing polymer are formed in this order.

As a pearlescent pigment coated with rutile-type titanium dioxide and exhibiting interference colors, METASHINE (registered trademark) MC1020RB manufactured by Nippon Sheet Glass Co., Ltd. was used. 50 g of this pearlescent pigment was suspended in 0.5 L of purified water and kept at 75° C. in a water bath. 5 g of a sodium silicate solution (37.1% of solid content of silica, manufactured by Wako Pure Chemical Industries, Ltd.) was weighed and diluted with purified water by a factor of 10, and the obtained solution was added slowly to the suspension. This procedure was carried out while maintaining the pH of the suspension at 9.2 to 9.4 with 3.5 mass % of hydrochloric acid. After the addition, the resulting suspension was stirred at 75° C. for 30 minutes. Subsequently, the suspension was filtered with filter paper to obtain a filtered solid. The filtered solid was washed with water. Thus, a pearlescent pigment coated with amorphous silica was obtained.

Thereafter, the treatment with the hydroxide or hydrated oxide of cerium and the treatment with the oxazoline group-containing polymer were carried out in the same manner as in Example 1. Thus, a pearlescent pigment, in which a flaky glass is coated with rutile-type titanium dioxide, silica, a hydroxide or hydrated oxide of cerium, and an oxazoline group-containing polymer in this order, was obtained.

As a result of an analysis, in the pearlescent pigment thus obtained, the deposition amount of silica was about 1 mass %, the deposition amount of the hydroxide or hydrated oxide of cerium was about 0.3 mass % in terms of cerium, and the deposition amount of the oxazoline group-containing polymer was 0.5 mass %. In this case, the deposition amount of cerium was equivalent to approximately 1.2 mass % of rutile-type titanium dioxide.

Example 6

Example 6 is the same pearlescent pigment as that of Example 2 except that a silica coating film is formed on a flaky glass coated with rutile-type titanium dioxide. Specifically, Example 6 is a pearlescent pigment in which a flaky glass, rutile-type titanium dioxide, silica, a hydroxide or hydrated oxide of cerium, and a layer containing an oxazoline group-containing polymer and a silane coupling agent are formed in this order.

As a pearlescent pigment coated with rutile-type titanium dioxide and exhibiting interference colors, METASHINE (registered trademark) MC1020RB manufactured by Nippon Sheet Glass Co., Ltd. was used. 50 g of this pearlescent pigment was suspended in 0.5 L of purified water and kept at 75° C. in a water bath. 5 g of a sodium silicate solution (37.1% of solid content of silica, manufactured by Wako Pure Chemical Industries, Ltd.) was weighed and diluted with purified water by a factor of 10, and the obtained solution was added slowly to the suspension. This procedure was carried out while maintaining the pH of the suspension at 9.2 to 9.4 with 3.5 mass % of hydrochloric acid. After the addition, the resulting suspension was stirred at 75° C. for 30 minutes. Subsequently, the suspension was filtered with filter paper to obtain a filtered solid. The filtered solid was washed with water. Thus, a pearlescent pigment coated with amorphous silica was obtained.

Thereafter, the treatment with the hydroxide or hydrated oxide of cerium and the treatment with the oxazoline group-containing polymer and the organic silane coupling agent were carried out in the same manner as in Example 2. Thus, a pearlescent pigment, in which a flaky glass is coated with rutile-type titanium dioxide, silica, a hydroxide or hydrated oxide of cerium, and a layer containing an oxazoline group-containing polymer and an organic silane coupling agent in this order, was obtained.

As a result of an analysis, in the pearlescent pigment thus obtained, the deposition amount of silica was about 1 mass %, the deposition amount of the hydroxide or hydrated oxide of cerium was about 0.3 mass % in terms of cerium, and the total deposition amount of the oxazoline group-containing polymer and the organic silane coupling agent was 0.6 mass %. In this case, the deposition amount of cerium was equivalent to approximately 1.2 mass % of rutile-type titanium dioxide.

Example 7

Example 7 is a pearlescent pigment in which a layer containing an acidic oxide or hydrated oxide of tungsten and a phosphoric acid salt is formed instead of the hydroxide or hydrated oxide of cerium in Example 5. Specifically, Example 7 is a pearlescent pigment in which a flaky glass, rutile-type titanium dioxide, silica, a layer containing an acidic oxide or hydrated oxide of tungsten and a phosphoric acid salt, and an oxazoline group-containing polymer are formed in this order.

The layer containing the acidic oxide or hydrated oxide of tungsten and the phosphoric acid salt was formed in the following manner. First, a 2 mass % aqueous solution of sodium tungstate (VI) was prepared using 0.6 g of sodium tungstate (VI) dihydrate ($Na_2WO_4.2H_2O$). Next, in the same manner as in Example 5, about 50 g of the pearlescent pigment coated with silica was suspended in 0.5 L of purified water and kept at 75° C. in a water bath, and the pH of the suspension was adjusted to pH6 with diluted nitric acid. The aqueous solution of sodium tungstate (VI) thus prepared and 20 mL of a 0.1N aqueous solution of phosphoric acid were added slowly to the suspension over a period of 10 minutes. After the addition, the resulting suspension was stirred at 75° C. for 30 minutes while keeping it at pH6. Subsequently, the suspension was filtered with filter paper to obtain a filtered solid. The filtered solid was washed with water. Thus, a pearlescent pigment coated with a layer containing an acidic oxide or hydrated oxide of tungsten and a phosphoric acid salt was obtained.

Subsequently, the treatment with the oxazoline group-containing polymer was carried out in the same manner as in Example 1. Thus, a pearlescent pigment, in which a flaky glass is coated with rutile-type titanium dioxide, silica, a layer containing an acidic oxide or hydrated oxide of tungsten and a phosphoric acid salt, and an oxazoline group-containing polymer in this order, was obtained.

As a result of an analysis, in the pearlescent pigment thus obtained, the deposition amount of silica was about 1 mass %, the deposition amount of the acidic oxide or hydrated oxide of tungsten was about 0.2 mass % in terms of tungsten, the deposition amount of the phosphoric acid salt was 0.02 mass % in terms of phosphorus, and the deposition amount of the oxazoline group-containing polymer was 0.5 mass %. In this case, the deposition amount of tungsten was equivalent to about 0.8 mass % of the rutile-type titanium dioxide.

Example 8

Example 8 is a pearlescent pigment obtained in the same manner as in Example 7, except that a coating film serving as the top surface contains an oxazoline group-containing polymer and an organic silane coupling agent. Specifically, Example 8 is a pearlescent pigment in which a flaky glass, rutile-type titanium dioxide, amorphous silica, a layer containing an acidic oxide or hydrated oxide of tungsten and a phosphoric acid salt, and a layer containing an oxazoline group-containing polymer and an organic silane coupling agent are formed in this order.

A coating film containing an oxazoline-containing polymer and an organic silane coupling agent was formed in the same manner as that described in Example 2.

As a result of an analysis, in the pearlescent pigment thus obtained, the deposition amount of amorphous silica was about 1 mass %, the deposition amount of the acidic oxide or hydrated oxide of tungsten was about 0.2 mass % in terms of tungsten, the deposition amount of the phosphoric acid salt was 0.02 mass % in terms of phosphorus, and the total deposition amount of the oxazoline group-containing polymer and the organic silane coupling agent was 0.6 mass %. In this case, the deposition amount of tungsten was equivalent to approximately 0.8 mass % of rutile-type titanium dioxide.

Example 9

Example 9 is a pearlescent pigment coated with a hydroxide or hydrated oxide of lanthanum instead of the hydroxide or hydrated oxide of cerium in Example 5. Specifically, Example 9 is a pearlescent pigment in which a flaky glass, rutile-type titanium dioxide, amorphous silica, a hydroxide or hydrated oxide of lanthanum, and an oxazoline group-containing polymer are formed in this order.

The hydroxide or hydrated oxide of lanthanum was formed in the following manner. First, a 2 mass % aqueous solution of lanthanum nitrate was prepared using 0.6 g of lanthanum (III) nitrate hexahydrate ($La(NO_3)_3.6H_2O$). About 50 g of the pearlescent pigment coated with amorphous silica was suspended in 0.5 L of purified water and kept at 75° C. in a water bath, and the pH of the suspension was adjusted to pH6 with diluted nitric acid. The lanthanum nitrate solution thus prepared and 2.0 g of a 1N aqueous solution of sodium hydroxide were added slowly to the suspension over a period of 10 minutes. After the addition, the resulting suspension was stirred at 75° C. for 30 minutes while keeping it at pH6. Subsequently, the suspension was filtered with filter paper to obtain a filtered solid. The filtered solid was washed with water. Thus, a pearlescent pigment coated with a hydroxide or hydrated oxide of lanthanum was obtained.

Subsequently, the treatment with the oxazoline group-containing polymer was carried out in the same manner as in Example 1. Thus, a pearlescent pigment, in which a flaky glass is coated with rutile-type titanium dioxide, amorphous silica, a hydroxide or hydrated oxide of lanthanum, and an oxazoline group-containing polymer in this order, was obtained.

As a result of an analysis, in the pearlescent pigment thus obtained, the deposition amount of amorphous silica was about 1 mass %, the deposition amount of the hydroxide or hydrated oxide of lanthanum was about 0.2 mass % in terms of lanthanum, and the deposition amount of the oxazoline group-containing polymer was 0.5 mass %. In this case, the deposition amount of lanthanum was equivalent to approximately 0.8 mass % of rutile-type titanium dioxide.

Example 10

Example 10 is a pearlescent pigment coated with a hydroxide or hydrated oxide of lanthanum instead of the hydroxide or hydrated oxide of cerium in Example 6. Specifically, Example 10 is a pearlescent pigment in which a flaky glass, rutile-type titanium dioxide, amorphous silica, a hydroxide or hydrated oxide of lanthanum, and a layer containing an oxazoline group-containing polymer and a silane coupling agent are formed in this order.

The hydroxide or hydrated oxide of lanthanum was formed in the same manner as in Example 9. Thus, a pearlescent pigment coated with the hydroxide or hydrated oxide of lanthanum was obtained.

Subsequently, the treatment with the oxazoline group-containing polymer and the silane coupling agent was carried out in the same manner as in Example 2. Thus, a pearlescent pigment, in which a flaky glass is coated with rutile-type titanium dioxide, amorphous silica, a hydroxide or hydrated oxide of lanthanum, and an oxazoline group-containing polymer in this order, was obtained.

As a result of an analysis, in the pearlescent pigment thus obtained, the deposition amount of amorphous silica was about 1 mass %, the deposition amount of the hydroxide or hydrated oxide of lanthanum was about 0.2 mass % in terms of lanthanum, and the total deposition amount of the oxazoline group-containing polymer and the organic silane coupling agent was 0.6 mass %. In this case, the deposition amount of lanthanum was equivalent to approximately 0.8 mass % of rutile-type titanium dioxide.

Example 11

Example 11 is a pearlescent pigment coated with a hydroxide or hydrated oxide of lanthanum instead of amorphous silica in Example 5. Specifically, Example 11 is a pearlescent pigment in which a flaky glass, rutile-type titanium dioxide, a hydroxide or hydrated oxide of lanthanum, a hydroxide or hydrated oxide of cerium, and an oxazoline group-containing polymer are formed in this order.

The hydroxide or hydrated oxide of lanthanum was formed in the following manner. First, a 2 mass % aqueous solution of lanthanum nitrate was prepared using 0.6 g of lanthanum (III) nitrate hexahydrate ($La(NO_3)_3.6H_2O$). About 50 g of the pearlescent pigment made of flaky glass coated with rutile-type titanium dioxide was suspended in 0.5 L of purified water and kept at 75° C. in a water bath, and the pH of the suspension was adjusted to pH6 with diluted nitric acid. The lanthanum nitrate solution thus prepared and 2.0 g of a 1N aqueous solution of sodium hydroxide were added slowly to the suspension over a period of 10 minutes. After the addition, the resulting suspension was stirred at 75° C. for 30 minutes while keeping it at pH6. Subsequently, the suspension was filtered with filter paper to obtain a filtered solid. The filtered solid was washed with water. Thus, a pearlescent pigment coated with the hydroxide or hydrated oxide of lanthanum was obtained.

Thereafter, the treatment with the hydroxide or hydrated oxide of cerium and the treatment with the oxazoline group-containing polymer were carried out in the same manner as in Example 1. Thus, a pearlescent pigment, in which a flaky glass is coated with rutile-type titanium dioxide, a hydroxide or hydrated oxide of lanthanum, a hydroxide or hydrated oxide of cerium, and an oxazoline group-containing polymer in this order, was obtained.

As a result of an analysis, in the pearlescent pigment thus obtained, the deposition amount of the hydroxide or hydrated oxide of lanthanum was about 0.2 mass % in terms of lanthanum, the deposition amount of the hydroxide or hydrated oxide of cerium was about 0.3 mass % in terms of cerium, and the deposition amount of the oxazoline group-containing polymer was 0.5 mass %. In this case, the deposition amount of lanthanum was equivalent to approximately 0.8 mass % of rutile-type titanium dioxide. The deposition amount of cerium was equivalent to approximately 1.2 mass % of rutile-type titanium dioxide. Accordingly, the total deposition amount of cerium and lanthanum was equivalent to approximately 2.0 mass % of the rutile-type titanium dioxide.

Example 12

Example 12 is a pearlescent pigment coated with a hydroxide or hydrated oxide of lanthanum instead of amorphous silica in Example 6. Specifically, Example 12 is a pearlescent pigment in which a flaky glass, rutile-type titanium dioxide, a hydroxide or hydrated oxide of lanthanum, a hydroxide or hydrated oxide of cerium, and a layer containing an oxazoline group-containing polymer and an organic silane coupling agent are formed in this order.

The hydroxide or hydrated oxide of lanthanum was formed in the same manner as in Example 11. Thus, a pearlescent pigment coated with the hydroxide or hydrated oxide of lanthanum was formed was obtained.

Thereafter, the treatment with the hydroxide or hydrated oxide of cerium and the treatment with the oxazoline group-containing polymer and the organic silane coupling agent were carried out in the same manner as in Example 2. Thus, a pearlescent pigment, in which a flaky glass is coated with rutile-type titanium dioxide, a hydroxide or hydrated oxide of lanthanum, a hydroxide or hydrated oxide of cerium, and a layer containing an oxazoline group-containing polymer and an organic silane coupling agent in this order, was obtained.

As a result of an analysis, in the pearlescent pigment thus obtained, the deposition amount of the hydroxide or hydrated oxide of lanthanum was about 0.2 mass % in terms of lanthanum, the deposition amount of the hydroxide or hydrated oxide of cerium was about 0.3 mass % in terms of cerium, and the total deposition amount of the oxazoline group-containing polymer and the organic silane coupling agent was 0.6 mass %. In this case, the deposition amount of lanthanum was equivalent to approximately 0.8 mass % of rutile-type titanium dioxide. The deposition amount of cerium was equivalent to approximately 1.2 mass % of rutile-type titanium dioxide. Accordingly, the total deposition amount of cerium and lanthanum was equivalent to approximately 2.0 mass % of rutile-type titanium dioxide.

Example 13

Example 13 is a pearlescent pigment coated with a layer containing an acidic oxide or hydrated oxide of tungsten and a phosphoric acid salt instead of amorphous silica in Example 5. Specifically, Example 13 is a pearlescent pigment in which a flaky glass, rutile-type titanium dioxide, a layer containing an acidic oxide or hydrated oxide of tungsten and a phosphoric acid salt, a hydroxide or hydrated oxide of cerium, and an oxazoline group-containing polymer are formed in this order.

The layer containing the acidic oxide or hydrated oxide of tungsten and the phosphoric acid salt was formed in the following manner. First, a 2 mass % aqueous solution of sodium tungstate was prepared using 0.6 g of sodium tungstate (VI) dihydrate ($Na_2WO_4 \cdot 2H_2O$). Next, in the same manner as in Example 5, about 50 g of the pearlescent pigment coated with rutile-type titanium dioxide was suspended in 0.5 L of purified water and kept at 75° C. in a water bath, and the pH of the suspension was adjusted to pH6 with diluted nitric acid. The aqueous solution of sodium tungstate (VI) thus prepared and 20 mL of a 0.1N aqueous solution of phosphoric acid were added slowly to the suspension over a period of 10 minutes. After the addition, the resulting suspension was stirred at 75° C. for 30 minutes while keeping it at pH6. Subsequently, the suspension was filtered with filter paper to obtain a filtered solid. The filtered solid was washed with water. Thus, a pearlescent pigment coated with the layer containing the acidic oxide or hydrated oxide of tungsten and the phosphoric acid salt was obtained.

Thereafter, the treatment with the hydroxide or hydrated oxide of cerium and the treatment with the oxazoline group-containing polymer were carried out in the same manner as in Example 1. Thus, a pearlescent pigment, in which a flaky glass is coated with rutile-type titanium dioxide, an acidic oxide or hydrated oxide of tungsten and a phosphoric acid salt, a hydroxide or hydrated oxide of cerium, and an oxazoline group-containing polymer in this order, was obtained.

As a result of an analysis, in the pearlescent pigment thus obtained, the deposition amount of the acidic oxide or hydrated oxide of tungsten was about 0.2 mass % in terms of tungsten, the deposition amount of the phosphoric acid salt was 0.02 mass % in terms of phosphorus, the deposition amount of the hydroxide or hydrated oxide of cerium was about 0.3 mass % in terms of cerium, and the deposition amount of the oxazoline group-containing polymer was 0.5 mass %. In this case, the deposition amount of tungsten was equivalent to approximately 0.8 mass % of rutile-type titanium dioxide. The deposition amount of cerium was equivalent to approximately 1.2 mass % of rutile-type titanium dioxide. Accordingly, the total deposition amount of cerium and tungsten was equivalent to approximately 2.0 mass % of rutile-type titanium dioxide.

Example 14

Example 14 is a pearlescent pigment coated with a layer containing an acidic oxide or hydrated oxide of tungsten and a phosphoric acid salt, instead of amorphous silica in Example 6. Specifically, Example 14 is a pearlescent pigment in which a flaky glass, rutile-type titanium dioxide, a layer containing an acidic oxide or hydrated oxide of tungsten and a phosphoric acid salt, a hydroxide or hydrated oxide of cerium, and a layer containing an oxazoline group-containing polymer and an organic silane coupling agent are formed in this order.

The layer containing the acidic oxide or hydrated oxide of tungsten and the phosphoric acid salt was formed in the same manner as in Example 13. Thus, a pearlescent pigment coated with the layer containing the acidic oxide or hydrated oxide of tungsten and the phosphoric acid salt was obtained.

Thereafter, the treatment with the hydroxide or hydrated oxide of cerium and the treatment with the oxazoline group-containing polymer and the organic silane coupling agent were carried out in the same manner as in Example 2. Thus, a pearlescent pigment, in which a flaky glass is coated with rutile-type titanium dioxide, an acidic oxide or hydrated oxide of tungsten and a phosphoric acid salt, a hydroxide or hydrated oxide of cerium, and an oxazoline group-containing polymer in this order, was obtained.

As a result of an analysis, in the pearlescent pigment thus obtained, the deposition amount of the acidic oxide or hydrated oxide of tungsten was about 0.2 mass % in terms of tungsten, the deposition amount of the phosphoric acid salt was 0.02 mass % in terms of phosphorus, the deposition amount of the hydroxide or hydrated oxide of cerium was about 0.3 mass % in terms of cerium, and the total deposition amount of the oxazoline group-containing polymer and the organic silane coupling agent was 0.6 mass %. In this case, the deposition amount of tungsten was equivalent to approximately 0.8 mass % of rutile-type titanium dioxide. The deposition amount of cerium was equivalent to approximately 1.2 mass % of rutile-type titanium dioxide. Accordingly, the total deposition amount of cerium and tungsten was equivalent to approximately 2.0 mass % of rutile-type titanium dioxide.

Example 15

Example 15 is a pearlescent pigment coated with a low-molecular weight oxazoline compound, instead of the oxazoline group-containing polymer in Example 1. Specifically, Example 15 is a pearlescent pigment in which a flaky glass, rutile-type titanium dioxide, cerium hydroxide, and a coating film of a low-molecular weight oxazoline compound are formed in this order.

As the low molecular weight oxazoline compound, 1.0 g of 2,2-(1,3-phenylene)-bis(2-oxazoline) (hereinafter referred to as "bisoxazoline") manufactured by Takeda Chemical Industries, Ltd. was prepared, added to 0.5 L of ion-exchanged water, and stirred. Thus, a treatment liquid was obtained. Thereafter, about 50 g of the pearlescent pigment coated with a hydroxide or hydrated oxide of cerium was added to the treatment liquid and stirred for 30 minutes, in the same manner as in Example 1. Then, the suspension was filtered with filter paper to obtain a filtered solid. The filtered solid was dried at 120° C. for 2 hours. Thus, a pearlescent pigment, in which a flaky glass is coated with rutile-type titanium dioxide, a hydroxide or hydrated oxide of cerium, and bisoxazoline in this order, was obtained.

As a result of an analysis, in the pearlescent pigment thus obtained, the deposition amount of the hydroxide or hydrated oxide of cerium was about 0.3 mass %, and the deposition amount of the bisoxazoline was 0.1 mass %. The deposition amount of cerium was equivalent to about 1.2 mass % of rutile-type titanium dioxide.

Example 16

Example 16 is a pearlescent pigment in which a silica coating film is formed on a flaky glass coated with trivalent iron oxide. Specifically, Example 16 is a pearlescent pigment in which a flaky glass, iron oxide, silica, a hydroxide or hydrated oxide of cerium, and an oxazoline group-containing polymer are formed in this order.

As a pearlescent pigment coated with iron oxide and exhibiting interference colors, METASHINE (registered trademark) MC1020TZ manufactured by Nippon Sheet Glass Co., Ltd. was used. 50 g of this pearlescent pigment was suspended in 0.5 L of purified water and kept at 75° C. in a water bath. 5 g of a sodium silicate solution (37.1% of solid content of silica, manufactured by Wako Pure Chemical Industries, Ltd.) was weighed and diluted with purified water by a factor of 10, and the obtained solution was added slowly to the suspension. This procedure was carried out while maintaining the pH of the suspension at 9.2 to 9.4 with 3.5 mass % of hydrochloric acid. After the addition, the resulting suspension was stirred at 75° C. for 30 minutes. Subsequently, the suspension was filtered with filter paper to obtain a filtered solid. The filtered solid was washed with water. Thus, a pearlescent pigment coated with amorphous silica was obtained.

Thereafter, the treatment with the hydroxide or hydrated oxide of cerium and the treatment with the oxazoline group-containing polymer were carried out in the same manner as in Example 1. Thus, a pearlescent pigment in which a flaky glass is coated with iron oxide, silica, a hydroxide or hydrated oxide of cerium, and an oxazoline group-containing polymer in this order, was obtained.

As a result of an analysis, in the pearlescent pigment thus obtained, the deposition amount of silica was about 1 mass %, the deposition amount of the hydroxide or hydrated oxide of cerium was about 0.3 mass % in terms of cerium, and the deposition amount of the oxazoline group-containing polymer was 0.5 mass %. In this case, the deposition amount of cerium was equivalent to about 1.2 mass % of the iron oxide.

Example 17

Example 17 is a pearlescent pigment coated with a hydroxide or hydrated oxide of lanthanum, instead of amorphous silica in Example 16. Specifically, Example 17 is a pearlescent pigment in which a flaky glass, trivalent iron oxide, a hydroxide or hydrated oxide of lanthanum, a hydroxide or hydrated oxide of cerium, and an oxazoline group-containing polymer are formed in this order.

The hydroxide or hydrated oxide of lanthanum was formed in the following manner. First, a 2 mass % aqueous solution of lanthanum nitrate was prepared using 0.6 g of lanthanum (III) nitrate hexahydrate. About 50 g of a pearlescent pigment made of flaky glass coated with iron oxide was suspended in 0.5 L of purified water and kept at 75° C. in a water bath, and the pH of the suspension was adjusted to pH6 with diluted nitric acid. The lanthanum nitrate solution thus prepared and 2.0 g of a 1N aqueous solution of sodium hydroxide were added slowly to the suspension over a period of 10 minutes. After the addition, the resulting suspension was stirred at 75° C. for 30 minutes while keeping it at pH6. Subsequently, the suspension was filtered with filter paper to obtain a filtered solid. The filtered solid was washed with water. Thus, a pearlescent pigment coated with a hydroxide or hydrated oxide of lanthanum was obtained.

Thereafter, the treatment with the hydroxide or hydrated oxide of cerium and the treatment with the oxazoline group-containing polymer were carried out in the same manner as in Example 1. Thus, a pearlescent pigment, in which a flaky glass is coated with iron oxide, a hydroxide or hydrated oxide of lanthanum, a hydroxide or hydrated oxide of cerium, and an oxazoline group-containing polymer in this order, was obtained.

As a result of an analysis, in the pearlescent pigment thus obtained, the deposition amount of the hydroxide or hydrated oxide of lanthanum was about 0.2 mass % in terms of lanthanum, the deposition amount of the hydroxide or hydrated oxide of cerium was about 0.3 mass % in terms of cerium, and the deposition amount of the oxazoline group-containing polymer was 0.5 mass %. In this case, the deposition amount of lanthanum was equivalent to about 0.8 mass % of iron oxide. The deposition amount of cerium was equivalent to about 1.2 mass % of iron oxide. Accordingly, the total deposition amount of lanthanum and cerium was equivalent to approximately 2.0 mass % of iron oxide.

Comparative Example 1

In Comparative Example 1, as a pearlescent pigment coated with rutile-type titanium dioxide and exhibiting interference colors, METASHINE (registered trademark) MC1020RB manufactured by Nippon Sheet Glass Co., Ltd. was used. This pigment is not coated with a covering layer.

Comparative Example 2

Comparative Example 2 is a pearlescent pigment subjected to surface treatment with an organic silane coupling agent, instead of with the oxazoline group-containing polymer in Example 5. Specifically, Comparative Example 2 is a pearlescent pigment in which a flaky glass, rutile-type titanium dioxide, amorphous silica, a hydroxide or hydrated oxide of cerium, and an organic silane coupling agent are formed in this order.

As an organic silane coupling agent, 0.5 g of 3-methacryloxy propyltriethoxysilane (A-174 manufactured by Nippon Unicar Co., Ltd.) was prepared, added to 0.5 L of ion-exchanged water, and stirred for hydrolysis thereof.

Thereafter, about 50 g of the pearlescent pigment coated with silica and a hydroxide or hydrated oxide of cerium was added to the hydrolysis solution and stirred for 30 minutes, in the same manner as in Example 5. Then, the suspension was filtered with filter paper to obtain a filtered solid. The filtered solid was dried at 120° C. for 2 hours. In this case, the amount of the organic silane coupling agent added was 1 mass %. Thus, a pearlescent pigment, in which a flaky glass is coated with rutile-type titanium dioxide, amorphous silica, a hydroxide or hydrated oxide of cerium, and an organic silane coupling agent in this order, was obtained.

As a result of an analysis, in the pearlescent pigment thus obtained, the deposition amount of the hydroxide or hydrated oxide of cerium was about 0.3 mass % in terms of cerium, and the deposition amount of the organic silane coupling agent was 0.1 mass %. In this case, the deposition amount of cerium was equivalent to approximately 1.2 mass % of rutile-type titanium dioxide.

Comparative Example 3

Comparative Example 3 is a pearlescent pigment subjected to surface treatment with an organic silane coupling agent, instead of with the oxazoline group-containing polymer in Example 3. Specifically, Comparative Example 3 is a pearlescent pigment in which a flaky glass, rutile-type titanium dioxide, a layer containing hydroxides or hydrated oxides of cerium and aluminum, and an organic silane coupling agent are formed in this order.

As an organic silane coupling agent, 0.5 g of 3-methacryloxypropyltriethoxysilane (A-174 manufactured by Nippon Unicar Co., Ltd.) was prepared, added to 0.5 L of ion-exchanged water, and stirred for hydrolysis thereof.

Thereafter, about 50 g of the pearlescent pigment coated with hydroxides or hydrated oxides of cerium and aluminum was added to the hydrolysis solution and stirred for 30 minutes, in the same manner as in Example 3. Then, the suspension was filtered with filter paper to obtain a filtered solid. The filtered solid was dried at 120° C. for 2 hours. Thus, a pearlescent pigment, in which a flaky glass is coated with rutile-type titanium dioxide, hydroxides or hydrated oxides of cerium and aluminum, and an organic silane coupling agent in this order, was obtained.

As a result of an analysis, in the pearlescent pigment thus obtained, the deposition amount of the hydroxide or hydrated oxide of cerium was about 0.3 mass % in terms of cerium, the deposition amount of the hydroxide or hydrated oxide of aluminum was about 0.3 mass % in terms of aluminum, and the deposition amount of the organic silane coupling agent was 0.1 mass %. In this case, the deposition amount of cerium was equivalent to approximately 1.2 mass % of rutile-type titanium dioxide. The deposition amount of aluminum was equivalent to about 1.2 mass % of rutile-type titanium dioxide. Accordingly, the total deposition amount of lanthanum and cerium was equivalent to about 2.4 mass % of rutile-type titanium dioxide.

Comparative Example 4

Comparative Example 4 is a pearlescent pigment subjected to surface treatment with an organic silane coupling agent, instead of with the oxazoline group-containing polymer in Example 16. Specifically, Comparative Example 4 is a pearlescent pigment in which a flaky glass, trivalent iron oxide, amorphous silica, a hydroxide or hydrated oxide of cerium, and an organic silane coupling agent are formed in this order.

As an organic silane coupling agent, 0.5 g of 3-methacryloxy propyltriethoxysilane (A-174 manufactured by Nippon Unicar Co., Ltd.) was prepared, added to 0.5 L of ion-exchanged water, and stirred for hydrolysis thereof.

Thereafter, about 50 g of the pearlescent pigment coated with silica and a hydroxide or hydrated oxide of cerium was added to the hydrolysis solution and stirred for 30 minutes, in the same manner as in Example 16. Then, the suspension was filtered with filter paper to obtain a filtered solid. The filtered solid was dried at 120° C. for 2 hours. Thus, a pearlescent pigment, in which a flaky glass is coated with iron oxide, amorphous silica, a hydroxide or hydrated oxide of cerium, and an organic silane coupling agent in this order, was obtained.

As a result of an analysis, in the pearlescent pigment thus obtained, the deposition amount of the hydroxide or hydrated oxide of cerium was about 0.3 mass % in terms of cerium, and the deposition amount of the organic silane coupling agent was 0.1 mass %. In this case, the deposition amount of cerium was equivalent to about 1.2 mass % of the iron oxide.

(Test and Evaluation)

Paints prepared using the pearlescent pigments obtained in Examples and Comparative Examples were applied by the following method, and the water resistant secondary adhesion and weather resistance thereof were evaluated.

(Preparation of Resin for Water-Based Metallic Paint)

First, a resin for a water-based metallic paint was prepared. A reaction vessel was charged with 70 parts by mass of butyl cellosolve, and further charged with 40 parts by mass of styrene monomer, 60 parts by mass of methyl methacrylate monomer, 25 parts by mass of methacrylate monomer, 45 parts by mass of hydroxymethyl methacrylate monomer, 120 parts by mass of butyl acrylate monomer, 3 parts by mass of lauryl mercaptan, and 3 parts by mass of azobisisobutyronitrile, allowed to react with each other at 120° C. while stirring, and then further stirred for 1 hour.

250 parts by mass of pure water and 30 parts by mass of dimethylethanolamine further were added. Thus, a water-based acrylic resin having a non-volatile content of 45 mass % and a number average molecular weight of 5000 was obtained. The acid value of this resin was 60, and the hydroxyl value thereof was 65.

(Preparation of Water-Based Metallic Paint)

Next, a water-based metallic paint was prepared. 15 parts by mass of each of the pearlescent pigments of Examples and Comparative Examples and 40 parts by mass of hexamethoxy methylol melamine, as a cross-linking agent, were added with stirring to 200 parts by mass of the above-mentioned acrylic resin. Thereby, the pigment weight content (PWC) of each of the pearlescent pigments of Examples and Comparative Examples was adjusted to 10 mass %. The viscosity of the resulting resin was adjusted with pure water, and thus a water-based metallic paint was obtained.

(Preparation of Water-Based Clear Paint)

In the same manner as for the resin for water-based metallic paints as described above, a polymer was prepared using 12 parts by mass of methyl methacrylate monomer, 5 parts by mass of methacrylate monomer, 15 parts by mass of hydroxymethyl methacrylate monomer, 60 parts by mass of butyl acrylate monomer, 3 parts by mass of lauryl mercaptan. Next, the polymer thus obtained was neutralized with dimethylethanolamine, and further diluted with pure water. Thus, a water-based acrylic resin having a non-volatile content of 40 mass % was obtained. To this acrylic resin was added hexamethoxy methylol melamine in a solid content ratio of 40 mass %, and the viscosity of the resulting resin was adjusted with pure water, and thus a water-based clear paint was obtained.

(Production of Coated Test Plate for Evaluation)

As a coated plate obtained by subjecting a base plate to zinc phosphate conversion treatment, cathodic electrodeposition coating and intermediate coating in this order, "D-7" (intermediate coating color: N=6.0) manufactured by Nippon Route Service Co. was used. The above-mentioned water-based metallic paint was applied to the coated plate with an air spray so as to have a dried thickness of 20 μm, and thereafter dried at 80° C. for 10 minutes. Subsequently, the water-based clear paint further was applied with an air spray so as to have a dried thickness of 30 μm, and left standing for 10 minutes. The coated plate thus obtained was baked at 150° C. for 30 minutes to obtain a coated test plate for evaluation.

(Method of Water Resistance Test)

The coated test plate for evaluation thus produced was heated to 80° C. using ion-exchanged water and immersed therein for 3 hours. Thereafter, the coated test plate was cooled slowly, and thus a sample for evaluation of water resistant secondary adhesion was obtained.

(Method of Accelerated Weathering Test)

An accelerated weathering test was conducted for 480 consecutive hours on the coated test plate thus prepared, with a Super Xenon Weather Meter (SX75 manufactured by Suga Test Instruments Co., Ltd.). The test conditions are as follows.

Light source: water-cooled xenon
Filter: quartz+#295
Irradiation illuminance: 180 (W/m², 300 nm to 400 nm)
Black panel temperature: 63 (° C.)
Humidity: 50±5 (% RH)
Irradiation method: continuous
Water spray cycle: 18 minutes per 120 minutes
Number of revolutions of sample rack: 1/30 revolutions per second (2 rpm).

The coated test plate further was subjected to evaluation of the orientation of the pearlescent pigment particles in the coating film and the color change between before and after the accelerated weathering test, by using a multi-angle spectrocolorimeter (manufactured by Color Techno System Corp.). In a coating film containing the pearlescent pigment, changes in lightness when viewed from different angles, so-called a "flop" property, is observed. In such a coating film, reflections of light are high in a highlight area and the brightness is high, while reflections of light are low in a shade area.

The orientation of pearlescent pigment particles has a great influence on the flop property of the pigment. Therefore, the measurement of the changes in lightness when observed from different angles allows the orientation of the pearlescent pigment particles in the coating film to be evaluated. A flop index is a measure of these changes in lightness in a numerical form, and the higher the flop index value is, the higher the flop property is and thus the more uniform the orientation of the pearlescent pigment particles is. The changes in lightness when observed from different angles is represented by a flop index (FI) defined by the following Equation 1.

$$FI = 2.69 \times (L^*_{15°} - L^*_{110°})^{1.11} / (L^*_{45°})^{0.86} \quad \text{(Equation 1)}$$

$L^*_{15°}$, $L^*_{110°}$, and $L^*_{45°}$ are values, in the Lab color system, measured at angular positions of 15, 110, and 45 degrees. Each position is rotated from the specular direction toward the light source (see FIG. 4). As a light source, a D65 light source defined by JIS Z8720 (2000) was used.

(Evaluation of Color Difference)

Figure 4:
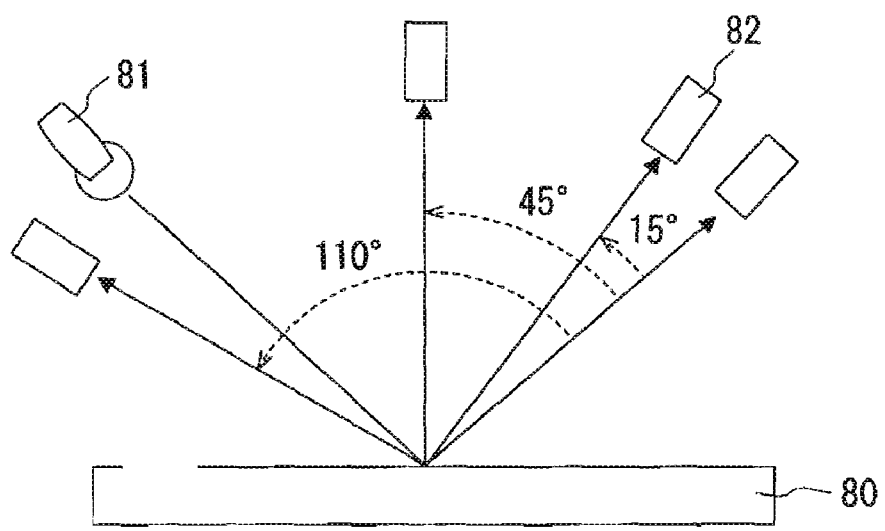
FIG. 4 is a diagram illustrating the principle for evaluating color differences.
Figure 5:
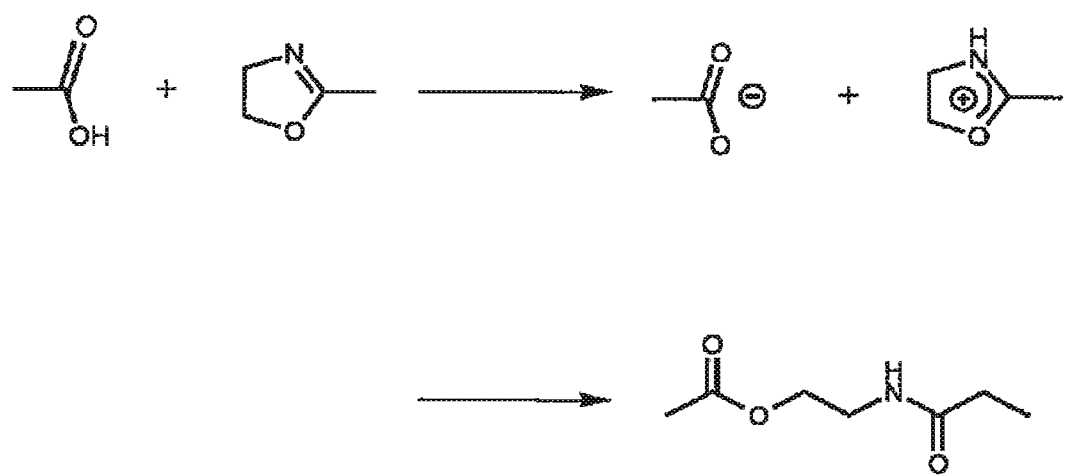
FIG. 5 is a diagram illustrating a mechanism of reaction between an oxazoline group and a carboxyl group.

The reflected color tone of a coating film including a pearlescent pigment varies with the angle of sight even if the incident angle of light is fixed. A description will be given below with reference to FIG. 4. First, as shown in FIG. 4, a light source 81 is provided at an angle of 45 degrees with respect to the direction perpendicular to the surface of a coating film 80 (i.e., at 45 degrees to the film surface) so that light strikes the surface of the coating film at an angle of 45 degrees. The color tone of the reflected light that strikes a detector 82 at an angle of 15 degrees off the specular direction of the incident light (i.e., the direction at 45 degrees to the film surface) toward the light source is defined as a highlight color. As the light source, a D65 light source was used.

This is because the influence of the surface reflection of the coating film is eliminated when observed at an angle of 15 degrees off the specular direction and thus the reflected color of the pearlescent pigment can be observed characteristically. On the other hand, when observed in the vicinity of the specular direction, the surface reflection of the pearlescent pigment and the coating film is too strong to identify the color developed by the pearlescent pigment itself. Accordingly, the measurement was carried out at an angle of 15 degrees off the specular direction to obtain the values of L*, a* and b* before and after the accelerated weathering test and to obtain the differences ΔL*, Δa* and Δb*. Furthermore, the color difference was calculated from these values ΔL*, Δa* and Δb* according to the following Equations, and a comparison was carried out. $L_0^*$, $a_0^*$ and $b_0^*$ are the values obtained before the accelerated weathering test, while $L_{480}^*$, $a_{480}^*$ and $b_{480}^*$ are the values obtained after the accelerated weathering test.

$$\Delta L^* = L_0^* - L_{480}^* \quad \text{(Equation 2)}$$

$$\Delta a^* = a_0^* - a_{480}^* \quad \text{(Equation 3)}$$

$$\Delta b^* = b_0^* - b_{480}^* \quad \text{(Equation 4)}$$

$$\Delta E^* = \{(\Delta L^*)^2 + (\Delta a^*)^2 + (\Delta b^*)^2\}^{1/2} \quad \text{(Equation 5)}$$

(Evaluation of Glossiness)

The 20-degree specular glossiness of the coated test plate before and after the test was measured with a glossmeter True Gloss GM-26PRO (manufactured by Murakami Color Research Laboratory) to obtain a glossiness retention rate. The glossiness retention rate indicates how much the glossiness is retained after the test (a water resistance test or an accelerated weathering test) compared to the glossiness before the test. This glossiness retention rate was obtained by the following Equation 6.

Glossiness retention rate (%)=((Glossiness after evaluation)/(Glossiness before evaluation))×100

(Evaluation of Water Resistance)

Furthermore, the glossiness of the coating film was observed visually before and after the water resistance test of the coated test plate. The evaluation criteria are as follows:

●: An image on the surface is very sharp, and no white clouding nor distortion of the image is seen ○: An image on the surface is sharp, but white clouding and distortion of the image are seen slightly x: An image on the surface is not sharp, and white clouding and distortion of the image are unpleasant in appearance Table 1 shows, as the evaluation results of the water resistant secondary adhesion of the coated test plates prepared as described above, the measurement results of the glossiness of the coating films before and after the water resistance test and the visual observation results of the glossiness thereof before and after the water resistance test.

Table 2 shows the flop indices (FI) of the coated test plates prepared as described above, as the evaluation results of the orientation of the pearlescent pigments therein.

Table 3 shows the color differences before and after the accelerated weathering test and the degrees of glossiness of the coated test plates, as the evaluation results of the weather resistance thereof.

TABLE 1

| | Water resistance test | | |
|---|---|---|---|
| | before | After | Glossiness retention rate (%) |
| Example 1 | ◎ | ◎ | 102.3 |
| Example 2 | ◎ | ◎ | 101.5 |
| Example 3 | ◎ | ○ | 98.7 |
| Example 4 | ◎ | ○ | 99.3 |
| Example 5 | ◎ | ○ | 98.1 |
| Example 6 | ◎ | ◎ | 100.5 |
| Example 7 | ◎ | ○ | 99.2 |
| Example 8 | ◎ | ○ | 99.8 |
| Example 9 | ◎ | ○ | 99.2 |
| Example 10 | ◎ | ◎ | 100.9 |
| Example 11 | ◎ | ◎ | 103.3 |
| Example 12 | ◎ | ◎ | 102.0 |
| Example 13 | ◎ | ◎ | 100.7 |
| Example 14 | ◎ | ○ | 99.5 |
| Example 15 | ◎ | ◎ | 101.6 |
| Example 16 | ◎ | ○ | 99.3 |
| Example 17 | ◎ | ◎ | 102.6 |
| Comparative Example 1 | ◎ | X | 87.3 |
| Comparative Example 2 | ◎ | X | 92.8 |
| Comparative Example 3 | ◎ | X | 93.6 |
| Comparative Example 4 | ◎ | X | 91.8 |

TABLE 2

| | Flop index (FI) |
|---|---|
| Example 1 | 1.64 |
| Example 2 | 1.66 |
| Example 3 | 1.44 |
| Example 4 | 1.49 |
| Example 5 | 1.44 |
| Example 6 | 1.57 |
| Example 7 | 1.47 |
| Example 8 | 1.49 |
| Example 9 | 1.56 |
| Example 10 | 1.58 |
| Example 11 | 1.61 |
| Example 12 | 1.59 |
| Example 13 | 1.63 |
| Example 14 | 1.56 |
| Example 15 | 1.65 |
| Example 16 | 7.73 |
| Example 17 | 8.49 |
| Comparative Example 1 | 1.36 |
| Comparative Example 2 | 1.38 |
| Comparative Example 3 | 1.29 |
| Comparative Example 4 | 6.90 |

TABLE 3

| | Glossiness retention rate (%) | Color difference (@15°) | | | |
|---|---|---|---|---|---|
| | | $\Delta L^*$ | $\Delta a^*$ | $\Delta b^*$ | $\Delta E^*$ |
| Example 1 | 101.1 | −0.04 | −0.23 | 0.18 | 0.29 |
| Example 2 | 100.0 | −0.07 | 0.01 | −0.21 | 0.22 |
| Example 3 | 98.0 | 0.39 | 0.35 | 0.27 | 0.53 |
| Example 4 | 99.8 | 0.17 | −0.32 | −0.55 | 0.66 |
| Example 5 | 97.0 | 0.18 | −0.43 | −0.07 | 0.47 |
| Example 6 | 101.3 | −0.04 | 0.18 | −0.52 | 0.55 |
| Example 7 | 99.2 | 0.17 | −0.32 | −0.55 | 0.66 |
| Example 8 | 99.4 | 0.02 | −0.1 | −0.22 | 0.24 |
| Example 9 | 98.2 | −0.41 | 0.16 | 0.04 | 0.44 |
| Example 10 | 99.9 | −0.44 | 0.05 | 0.19 | 0.48 |
| Example 11 | 100.3 | 0.12 | −0.05 | 0.33 | 0.35 |
| Example 12 | 99.7 | 0.17 | −0.08 | −0.48 | 0.52 |
| Example 13 | 100.7 | 0.23 | 0.11 | 0.32 | 0.41 |
| Example 14 | 99.4 | 0.26 | −0.21 | −0.45 | 0.56 |
| Example 15 | 101.1 | 0.34 | −0.23 | 0.15 | 0.44 |
| Example 16 | 98.3 | 0.20 | −0.17 | 0.33 | 0.42 |
| Example 17 | 99.8 | 0.11 | −0.14 | 0.09 | 0.20 |
| Comparative Example 1 | 90.1 | 0.16 | −1.33 | −2.25 | 2.62 |
| Comparative Example 2 | 95.5 | 0 | 0.15 | −0.4 | 0.43 |
| Comparative Example 3 | 96.6 | 0.34 | −0.81 | 0.62 | 1.08 |
| Comparative Example 4 | 94.4 | 0.49 | −0.58 | 0.63 | 0.99 |

The study of the evaluation results of the above-mentioned Examples and Comparative Examples revealed as follows. It should be noted that each of Examples 1 to 15 and Comparative Examples 1 to 3 is a coating film using a pearlescent pigment in which a flaky glass is coated with the first layer composed of titanium dioxide, and each of Examples 16 and 17 and Comparative Example 4 is a coating film using a pearlescent pigment in which a flaky glass is coated with the first layer composed of iron oxide.

As shown in Table 1, Examples 1 to 17 had higher glossiness retention rates than those of Comparative Examples 1 to 4, and thus Examples 1 to 17 each had excellent water resistant secondary adhesion. The glossiness retention rates of the coating films using the pearlescent pigments of Examples 1 to 17 were all high values of 98% or more. Examples 1 to 17 also achieved excellent visual observation results after the water resistance test.

Figure 2:
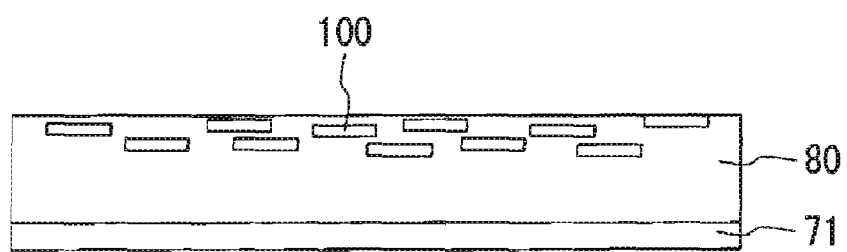
FIG. 2 is a schematic view of pearlescent pigment particles that are oriented uniformly in a coating film.
Figure 3:
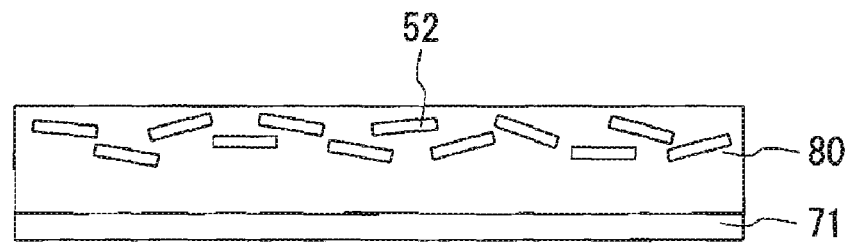
FIG. 3 is a schematic view of pearlescent pigment particles that are oriented randomly in a coating film.

Furthermore, as shown in Table 2, Examples 1 to 15 (or Examples 16 and 17) had higher FI values than those of Comparative Examples 1 to 3 (or Comparative Example 4). In other words, as shown in the schematic diagram of FIG. 2, Examples 1 to 17 each had a uniform distribution and orientation of the pearlescent pigment 100 particles in the coating film 80 formed on the coated substrate 71. Examples 1 to 17 had high color developability. In contrast, as shown in the schematic diagram of FIG. 3, Comparative Examples 1 to 4 each had a random distribution and orientation of the pearlescent pigment 52 particles (not subjected to oxazoline treatment) in the coating film 80.

Moreover, as shown in Table 3, Comparative Example 2 had a low glossiness retention rate of 95.5% although it had an excellent color difference value $\Delta E^*$, which shows that Comparative Example 2 was degraded obviously in its glossiness after the accelerated weathering test, when observed visually. In contrast, Example 5 had a glossiness retention rate of 97.0% although it had a color difference value $\Delta E^*$ comparable to that of Comparative Example 2. Hardly any obvious degradation of the glossiness was observed visually after the accelerated weathering test. When the value $\Delta E^*$ exceeds 1.0, the degradation can be observed visually, but it is difficult to tell which is better when the value $\Delta E^*$ is about 0.5 because the measurement error is about 0.3. Example 6 had a considerably improved glossiness retention rate, although it had a slightly lower $\Delta E^*$ value than that of Comparative Example 2.

Furthermore, the color measurement results after the accelerated weathering test show that the coating films of Examples 1 to 17, on average, changed their colors less significantly than those of Comparative Examples 1 to 4, and thus had higher weather resistance.

As described above, in the case where the top surface of the pearlescent pigment is subjected to surface treatment with an oxazoline group-containing polymer and/or an oxazoline group-containing oligomer, the particles of the pearlescent pigment are distributed and oriented uniformly in the coating film, and thus the pigment shows high color developability. In addition, the pigment has improved water resistant secondary adhesion and weather resistance.

The evaluation results of Examples 16 and 17 and Comparative Example 4 using iron oxide instead of titanium dioxide had the same tendency as that of Example 1 to 15 and Comparative Examples 1 to 3. This means that a pearlescent pigment coated with an oxazoline group-containing polymer (or oligomer) improves its water resistant secondary adhesion and weather resistance, regardless of the material of a primary coating layer which is in contact with the flaky glass.

The invention claimed is:

1. A pearlescent pigment comprising:
a flaky substrate;
a first layer that contains at least one material selected from a group consisting of titanium dioxide and iron oxide, wherein the first layer is formed on the flaky substrate;
a second layer that contains a compound having an oxazoline group, wherein the second layer is formed on the first layer being interposed between the flaky substrate and the second layer, and the second layer serves as a top surface of the pearlescent pigment; and
a third layer that contains a polyvalent metal compound, wherein the third layer is provided between the first layer and the second layer, and the third layer is free from a hydroxide or a hydrated oxide of aluminum,
wherein the compound having the oxazoline group in the second layer and the polyvalent metal compound in the third layer form a chelate.

2. The pearlescent pigment according to claim 1, wherein the polyvalent metal compound is a hydroxide or a hydrated oxide of at least one metal selected from the group consisting of lanthanum, cerium, and tungsten.

3. The pearlescent pigment according to claim 1, wherein the compound having an oxazoline group is a polymer.

4. The pearlescent pigment according to claim 1, wherein the compound having an oxazoline group is an oligomer.

5. The pearlescent pigment according to claim 1, wherein the compound having an oxazoline group is a polyvalent oxazoline compound.

6. The pearlescent pigment according to claim 1, wherein the second layer further comprises a coupling agent.

7. The pearlescent pigment according to claim 1, further comprising a fourth layer that is provided between the first layer and the third layer and consists essentially of silicon dioxide.

8. The pearlescent pigment according to claim 2, further comprising a fourth layer that is provided between the first layer and the third layer, wherein the fourth layer comprises a polyvalent metal compound having a metal element that is different from a metal element of the polyvalent metal compound contained in the third layer.

9. The pearlescent pigment according to claim 1, wherein the flaky substrate consists essentially of one material selected from the group consisting of glass, mica, synthetic mica, silica, and alumina.

10. The pearlescent pigment according to claim 1, wherein the compound having the oxazoline group is a dioxazoline compound.

11. The pearlescent pigment according to claim 1, wherein the polyvalent metal compound is at least one material selected from the group consisting of a hydroxide and a hydrated oxide of lanthanum.

12. The pearlescent pigment according to claim 1, wherein the polyvalent metal compound is at least one material selected from the group consisting of a hydroxide or a hydrated oxide of lanthanum and a hydroxide or a hydrated oxide of cerium.

* * * * *